US011169258B2

United States Patent
Rao et al.

(10) Patent No.: US 11,169,258 B2
(45) Date of Patent: Nov. 9, 2021

(54) TRANSPORT-BASED SYNTHETIC APERTURE RADAR NAVIGATION SYSTEMS AND METHODS

(71) Applicant: The Boeing Company, Chicago, IL (US)

(72) Inventors: Shankar R. Rao, Norwalk, CA (US); Kang-Yu Ni, Calabasas, CA (US); Soheil Kolouri, Calabasas, CA (US)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 16/407,460

(22) Filed: May 9, 2019

(65) Prior Publication Data

US 2020/0355822 A1    Nov. 12, 2020

(51) Int. Cl.
*G01S 13/90* (2006.01)
*G01S 7/41* (2006.01)
*G01S 13/00* (2006.01)

(52) U.S. Cl.
CPC .................. *G01S 13/9027* (2019.05)

(58) Field of Classification Search
CPC ... G01S 13/9027; G01S 7/412; G01S 13/9052
See application file for complete search history.

(56) References Cited

U.S. PATENT DOCUMENTS

| 6,362,775 B1* | 3/2002 | Goebel | G01S 13/9023 342/64 |
| 8,121,379 B2* | 2/2012 | Chefd'hotel | A61B 90/36 382/132 |
| 2003/0132875 A1* | 7/2003 | Goebel | G01S 13/9023 342/25 R |
| 2011/0170781 A1* | 7/2011 | Bronstein | G06K 9/6289 382/190 |
| 2014/0161348 A1* | 6/2014 | Sutherland | G06K 9/00281 382/162 |
| 2015/0378014 A1* | 12/2015 | Koudelka | G01S 13/9027 342/25 A |

(Continued)

OTHER PUBLICATIONS

Y. Rubneretal, "The Earth Mover's Distance as a Metric for Image Retrieval"; published in the International Journal of Computer Vision; vol. 40, No. 2; published in the year 2000; pp. 99-121; Kluwer Academic Publishers, Alphen aan den Rijn, The Netherlands. (Year: 2000).*

(Continued)

*Primary Examiner* — Bernarr E Gregory
(74) *Attorney, Agent, or Firm* — Haynes and Boone, LLP

(57) ABSTRACT

Systems and methods according to one or more embodiments are provided for registration of synthetic aperture range profile data to aid in SAR-based navigation. In one example, a SAR-based navigation system includes a memory comprising a plurality of executable instructions. The SAR-based navigation system further includes a processor adapted to receive range profile data associated with observed views of a scene, compare the range profile data to a template range profile data of the scene, and estimate registration parameters associated with the range profile data relative to the template range profile data to determine a deviation from the template range profile data.

20 Claims, 15 Drawing Sheets

(56) References Cited

U.S. PATENT DOCUMENTS

2017/0083608 A1* 3/2017 Ye .................... G06N 20/10
2018/0372862 A1* 12/2018 Ni .................... G01S 13/9052

OTHER PUBLICATIONS

K. Wang et al, "Synthetic Aperture Radar Image Generation With Deep Generative Models"; published in IEEE Geoscience and Remote Sensing Letters; vol. 16, No. 6; Jun. 2019; pp. 912-916; Date of Publication stated on the document is Dec. 18, 2018. (Year: 2018).*

David G. Lowe, "Distinctive Image Features from Scale-Invariant Keypoints", International Journal of Computer Vision, Jan. 5, 2004, vol. 60, No. 2, pp. 1-28, Computer Science Department, University of British Columbia, Vancouver, B.C., Canada.

Bay et al., "SURF: Speeded Up Robust Features", Computer Vision and Image Understanding, European Conference on Computer Vision, ECCV 2006: Computer Vision—ECCV 2006, Jun. 2008, vol. 110, No. 3, pp. 1-14, Part of the *Lecture Notes in Computer Science book* series (LNCS, vol. 3951).

Oliva et al., "Building the gist of a scene: the role of global image features in recognition", Chapter 2, Progress in Brain Research, Feb. 2006, vol. 155, pp. 23-36, ISSN 0079-6123, DOI: 10.1016/S0079-6123(06)55002-2, PubMed ID: 17027377, US National Library of Medicine National Institutes of Health.

Wessel et al., "Registration of Near Real-Time SAR Images by Image-To-Image Matching", PIA07-Photogrammetric Image Analysis, Sep. 19-21, 2007, vol. 3, pp. 179-184, International Archives of Photogrammetry, Remote Sensing and Spatial Information Sciences, Munich, Germany.

Suri et al., "Modifications in the SIFT operator for effective SAR image matching", Sep. 2010, vol. 1, No. 3, pp. 243-256, doi:10.1080/19479832.2010.495322, published in International Journal of Image and Data Fusion, German Aerospace Center DLR, Remote Sensing Technology Institute, Münchener Str. 20, 82234 Wessling, Germany.

Tang et al., "A New Local Feature Descriptor for SAR Image Matching", Aug. 25-28, 2014, pp. 1823-1827, Progress in Electromagnetics Research Symposium Proceedings, Guangzhou, China.

Tim Payne, "Pre-formation SAR to SAR image registration", IEEE 2001 International, Date of Conference: Jul. 9-13, 2001, vol. 7, pp. 3033-3035, Published in: IGARSS 2001. Scanning the Present and Resolving the Future. Proceedings. IEEE 2001 International Geoscience and Remote Sensing Symposium (Cat. No. 01CH37217), DOI: 10.1109/IGARSS.2001.978245, Print ISBN: 0-7803-7031-7, IEEE.

Eric Todd Quinto, "An Introduction to X-ray tomography and Radon Transforms", Proceedings of Symposia in Applied Mathematics, Jan. 2006, vol. 63, pp. 1-23, DOI: 10.1090/psapm/063/2208234, American Mathematical Society.

Frank Natterer, "The Radon Transform and Related Transforms", The Mathematics of Computerized Tomography, Jul. 1985, vol. 32, pp. 9-11, Society for Industrial and Applied Mathematics, University Münster, Münster, Germany.

Kolouri et al., "Optimal Mass Transport: Signal processing and machine-learning applications", Jul. 11, 2017, vol. 34, No. 4, pp. 43-59, IEEE Signal Processing Magazine.

Kolouri et al., "The Radon Cumulative Distribution Transform and Its Application to Image Classification", Feb. 2016, vol. 25, No. 2, pp. 920-934, IEEE Transactions on Image Processing.

Kolouri et al., "Sliced Wasserstein Kernels for Probability Distributions", Jun. 2016, pp. 5258-5267, IEEE Conference on Computer Vision and Pattern Recognition (CVPR).

Cedric Villani, "Optimal transport, old and new", Dec. 22, 2006, vol. 338, Contents, Preface, Conventions, and Introduction are included, pp. 15-635, Springer Science & Business Media.

Mobahi et al.,"On the Link Between Gaussian Homotopy Continuation and Convex Envelopes", 2015, vol. 8932, pp. 1-14, International Workshop on Energy Minimization Methods in Computer Vision and Pattern Recognition, Energy Minimization Methods in Computer Vision and Pattern Recognition, EMMCVPR 2015, Part of the *Lecture Notes in Computer Science* book series (LNCS, vol. 8932), Lecture Notes in Computer Science, Springer, Cham.

* cited by examiner

TRANSPORT-BASED SYNTHETIC APERTURE RADAR NAVIGATION SYSTEMS AND METHODS

TECHNICAL FIELD

One or more embodiments relate generally to Synthetic Aperture Radar (SAR) mapping and registration, and more particularly, for example, to techniques for range profile based SAR mapping and registration.

BACKGROUND

In the field of synthetic aperture radar (SAR) based navigation systems, there is an ongoing effort to reduce computational complexity and resources required, particularly on autonomous platforms with limited computational power. In some global positioning system (GPS) denied environments, navigation guidance is provided by SAR imagery. Traditional SAR imagery navigation systems apply techniques developed in image processing for matching and registration of processed SAR images of a scene to expected ground landmarks of the same scene. Contemporary SAR based navigation methods require extensive processing and data resources for SAR image reconstruction and feature detection. Thus, there is a need for improved techniques for synthetic aperture (SAR) based navigation on platforms, such as for example for systems with limited computational power and resources.

SUMMARY

Systems and methods are disclosed herein in accordance with one or more examples that provide techniques for matching and registration of SAR radar range profile data, for example, to estimate geometric transformations directly from the range profile data in order to provide navigation guidance. In one or more examples, SAR phase history data of a scene is converted to observed range profile data and compared to a template range profile of the same scene. A p-Wasserstein distance is used as the metric for registration that provides a smooth energy landscape, and a gradient descent optimization is used to estimate the geometric transformations based on the p-Wasserstein distance.

In one example, a method includes receiving range profile data associated with observed views of a scene; comparing the range profile data to a template range profile data of the scene; and estimating registration parameters associated with the range profile data relative to the template range profile data to determine a deviation from the template range profile data.

In another example, a system includes a memory comprising a plurality of executable instructions; and a processor adapted to: receive range profile data associated with observed views of a scene; compare the range profile data to a template range profile data of the scene; and estimate registration parameters associated with the range profile data relative to the template range profile data to determine a deviation from the template range profile data.

The scope of the invention is defined by the claims, which are incorporated into this section by reference. A more complete understanding of examples of the invention will be afforded to those skilled in the art, as well as a realization of additional advantages thereof, by a consideration of the following detailed description of one or more examples.

Reference will be made to the appended sheets of drawings that will first be described briefly.

DETAILED DESCRIPTION

Systems and methods are provided for matching and registration of synthetic aperture radar (SAR) range profile data of a scene with a pre-stored range profile template of the same scene to furnish navigation guidance information, for example, in accordance with one or more examples. In a GPS denied environment, a drone, a fixed wing craft, a spacecraft, or other type of unmanned or manned vehicle rely on SAR-based range profile data to provide for navigation.

In one or more examples described herein, navigation techniques are described that reduce the computation, memory, and transmission bandwidth required of traditional SAR-based navigation systems. For example, traditional SAR image navigation techniques often match salient features in multiple SAR images that can be detected and matched. Constructing multiple SAR images to use for such navigation techniques requires extensive computation resources, memory, and transmission bandwidth.

In an illustrated example, the systems and methods described herein rely on observed range profile data of a scene. Range profile data of a SAR template of the same scene (e.g., a template range profile data) is used to compare to the observed range profile data. A p-Wasserstein distance corresponding to the observed range profile data with respect to the template range profile data is calculated and gradient descent optimization is performed based on the p-Wasserstein distance to estimate a rotation angle, scaling, and a translation of the observed range profile data with respect to the template range profile data of the scene.

By leveraging the smoothness characteristic of p-Wasserstein distances, the systems and methods described herein can recover the registration parameters from an undersampled SAR phase history data in few iterations, reducing the sensing requirements of a platform by a factor of twenty five to one hundred times. Further, by reducing the sensing, computation, memory, and transmission requirements of the navigation function, the systems and methods described herein enables SAR-based navigation to be deployed on platforms with limited computational power and low size, weight and power (SWaP).

Figure 1:
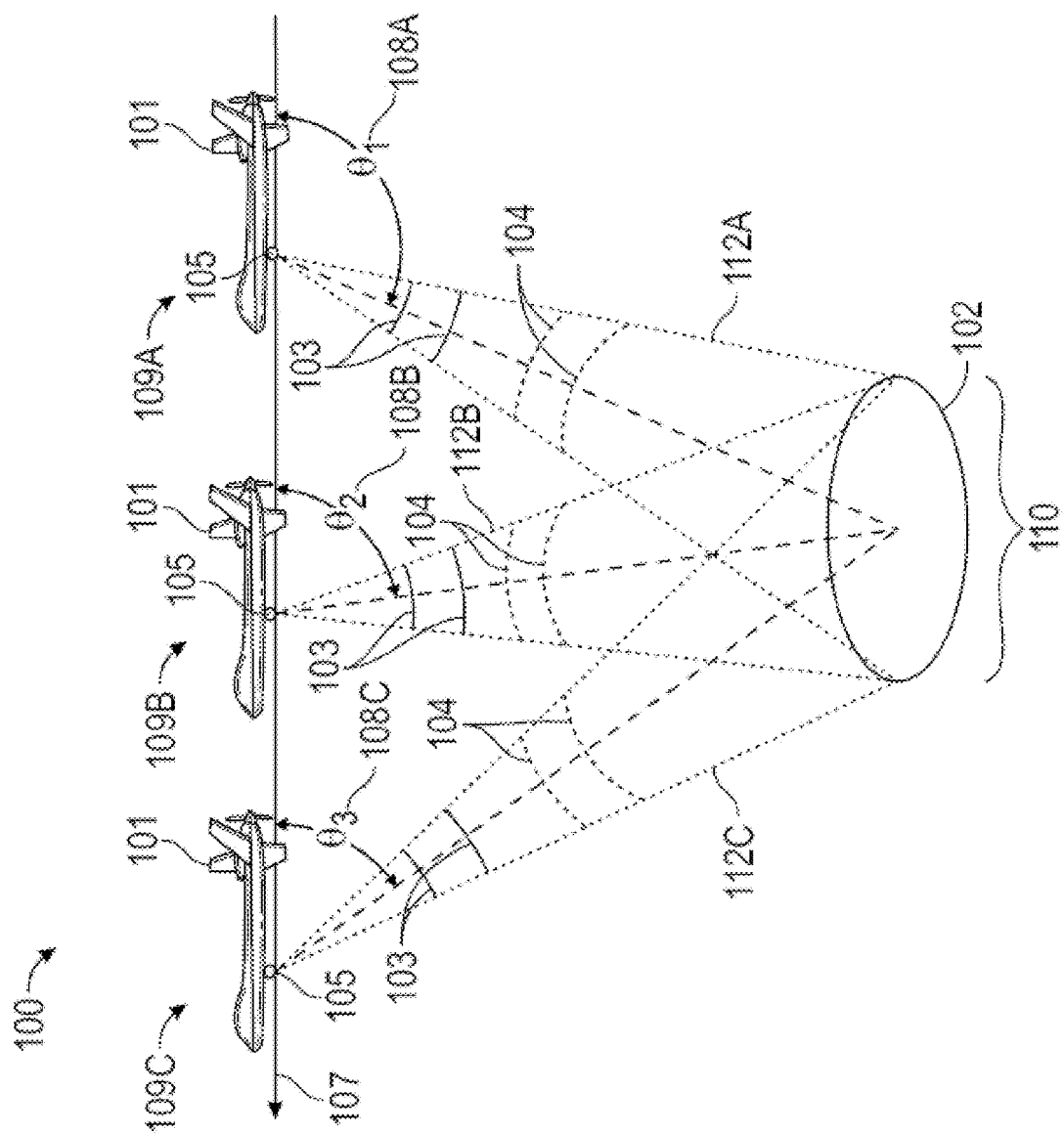
FIG. 1 illustrates a diagram of a spotlight mode SAR based navigation system in accordance with one or more examples of the disclosure.

FIG. 1 illustrates a diagram of a SAR-based navigation system 100 in accordance with one or more examples of the disclosure. In one or more examples, SAR-based navigation system 100 is implemented as a spotlight-mode SAR-based navigation system. In some examples, other mode implementations are possible, as described herein. In some examples, SAR-based navigation system 100 is mounted on a moving platform such as an aerial vehicle 101, for example, and used to receive radar phase history data 112A-112C of a scene 102. Electromagnetic waves 103 (e.g., radar pulse energy) are sequentially transmitted and backscattered waves 104 (e.g., backscattered radar pulse energy) are collected by a SAR radar system for navigation guidance. Consecutive time intervals of radar transmission and reception are used to receive radar phase history data 112A-112C of scene 102 at different positions 109A-109C along a flight path 107.

The combination of backscattered waves 104 that are received allows construction of a synthetic aperture that is longer than the physical aperture length. Processing the combination of raw radar data (e.g., radar phase history data 112A-112C of scene 102) enables the construction of a synthetic aperture radar image 110 (e.g., a high resolution synthetic aperture radar image) of the captured scene 102. Systems and methods described herein obviate the need for the construction of the synthetic aperture radar image in order to perform the navigation task, instead estimating the geometric transformation parameters directly from the range profiles of the received phase history data and range profile template data of the scene.

In some examples, aerial vehicle 101, for example, is flown past or around scene 102 (e.g., a stationary ground location). In one or more examples, aerial vehicle 101 is any type of unmanned or manned aerial vehicle, such as a manned aircraft, an unmanned drone, or an orbiting spacecraft, for example. Scene 102 is illuminated with electromagnetic waves 103 that are transmitted by a linear frequency modulated chirp signal, for example, from SAR radar system for navigation guidance (e.g., SAR navigation guidance system 105) mounted to aerial vehicle 101. Backscattered waves 104 are received at SAR navigation guidance system 105 from multiple observation angles 108A, 108B, and 108C, for example, and captured as radar phase history data 112A-112C, respectively. In some examples, radar phase history data 112A-112C of backscattered waves 104 are received at one or more radar frequencies, ranging from one gigahertz to twelve gigahertz, for example.

Figure 2:
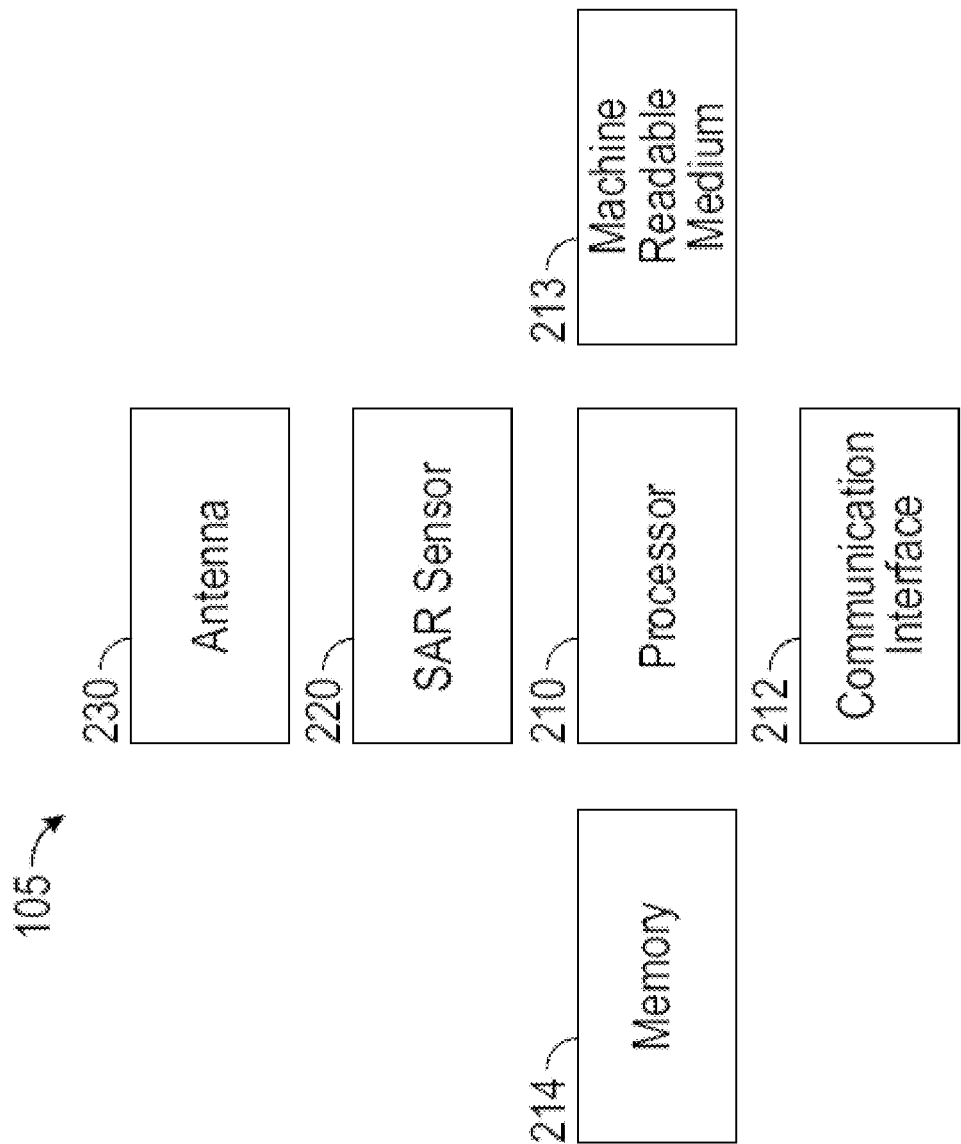
FIG. 2 illustrates a block diagram of a SAR radar system for navigation guidance in accordance with an example of the disclosure.

FIG. 2 illustrates a block diagram of a SAR radar system for navigation guidance in accordance with an example of the disclosure. In some examples, SAR navigation guidance system 105 is used to capture and process radar phase history data 112A-112C in accordance with various techniques described herein. In various examples, components of SAR navigation guidance system 105 are provided in aerial vehicle 101 implemented as a drone, for example.

In one example, SAR navigation guidance system 105 includes a processor 210, a synthetic aperture radar (SAR) sensor 220 (e.g., a synthetic aperture radar), and an antenna 230. In one or more examples, SAR navigation guidance system 105 is implemented as a synthetic radar device to capture radar phase history data 112A-112C at respective observation angles 108A-108C (e.g., observed views) of a scene 102 (e.g., a ground location). SAR navigation guidance system 105 represents any type of SAR radar device which transmits and receives electromagnetic radiation and provides representative data in the form of radar phase history data 112A-112C. In some examples, SAR navigation guidance system 105 is implemented to transmit and receive radar energy pulses in one or more frequency ranges from approximately one gigahertz to sixteen gigahertz. In various examples, other frequencies are possible, from frequencies less than one gigahertz to greater than sixteen gigahertz. In some examples, SAR navigation guidance system 105 is mounted to a platform of various types of unmanned flying vehicles, such as, for example, a drone or an orbiting spacecraft. In other examples, SAR navigation guidance system 105 is mounted to a platform of various types of manned flying vehicles.

Processor 210 includes, for example, a microprocessor, a single-core processor, a multi-core processor, a microcontroller, an application-specific integrated circuit (ASIC), a logic device (e.g., a programmable logic device adapted to perform processing operations), a digital signal processing (DSP) device, one or more memories for storing executable instructions (e.g., software, firmware, or other instructions), or any other appropriate combination of processing device or memory to execute instructions to perform any of the various operations described herein. Processor 210 is adapted to interface and communicate with memory 214 and SAR sensor 220 via a communication interface 212 to perform method and processing steps as described herein. Communication interface 212 includes wired or wireless communication buses within aerial vehicles described herein.

In various examples, it should be appreciated that processing operations (e.g., instructions) are integrated in software or hardware or both as part of processor 210, or code (e.g., software or configuration data) which is stored in a memory 214. Examples of processing operations disclosed herein are stored by a machine readable medium 213 in a non-transitory manner (e.g., a memory, a hard drive, a compact disk, a digital video disk, or a flash memory) to be executed by a computer (e.g., logic or processor-based system) to perform various methods disclosed herein. In one or more examples, the machine readable medium 213 is included as part of processor 210.

In various examples, processor 210 is adapted to apply a radon transform to observed synthetic aperture radar phase history data of the scene to generate observed range profile data. Processor 210 is also adapted to apply a radon transform to template synthetic aperture radar phase history data of the scene to generate a template range profile data of the same scene.

Memory 214 includes, in one example, one or more memory devices (e.g., one or more memories) to store data and information. The one or more memory devices includes various types of memory including volatile and non-volatile memory devices, such as RAM (Random Access Memory), ROM (Read-Only Memory), EEPROM (Electrically-Erasable Read-Only Memory), flash memory, or other types of memory. In one example, processor 210 is adapted to execute software stored in memory 214 to perform various methods, processes, and operations in a manner as described herein. In some examples, memory 214 stores received radar phase history data 112A-112C of a scene or radar phase history template data of the same scene or some combination. In various examples, memory 214 stores template range profile data of a scene and observed range profile data of the scene.

SAR sensor 220, in some examples, is used to transmit electromagnetic waves 103 (e.g., radar pulse energy) and receive backscattered waves 104 (e.g., received radar phase history data 112A-112C) of scene 102, for example. SAR sensor 220 includes, in one example, a radar transmitter to produce radar pulses that are provided to an antenna 230 and radiated in space toward scene 102 by antenna 230 as electromagnetic waves 103. SAR sensor 220 further includes a radar receiver to receive backscattered waves 104 from antenna 230. Backscattered waves 104 are received by SAR sensor 220 as received radar phase history data 112A-112C at respective observation angles 108A-108C of scene 102. SAR sensor 220 communicates received radar phase history data 112A-112C to processor 210 or memory 214 or both via communication interface 212.

Antenna 230, in some examples, is implemented to both transmit electromagnetic waves 103 and receive backscattered waves 104 (e.g., backscattered radar pulse energy). In some examples, antenna 230 is implemented as a parabolic antenna. In other examples, antenna 230 is implemented as a phased array antenna. Other implementations of antenna 230 are possible in other examples.

Figure 3:
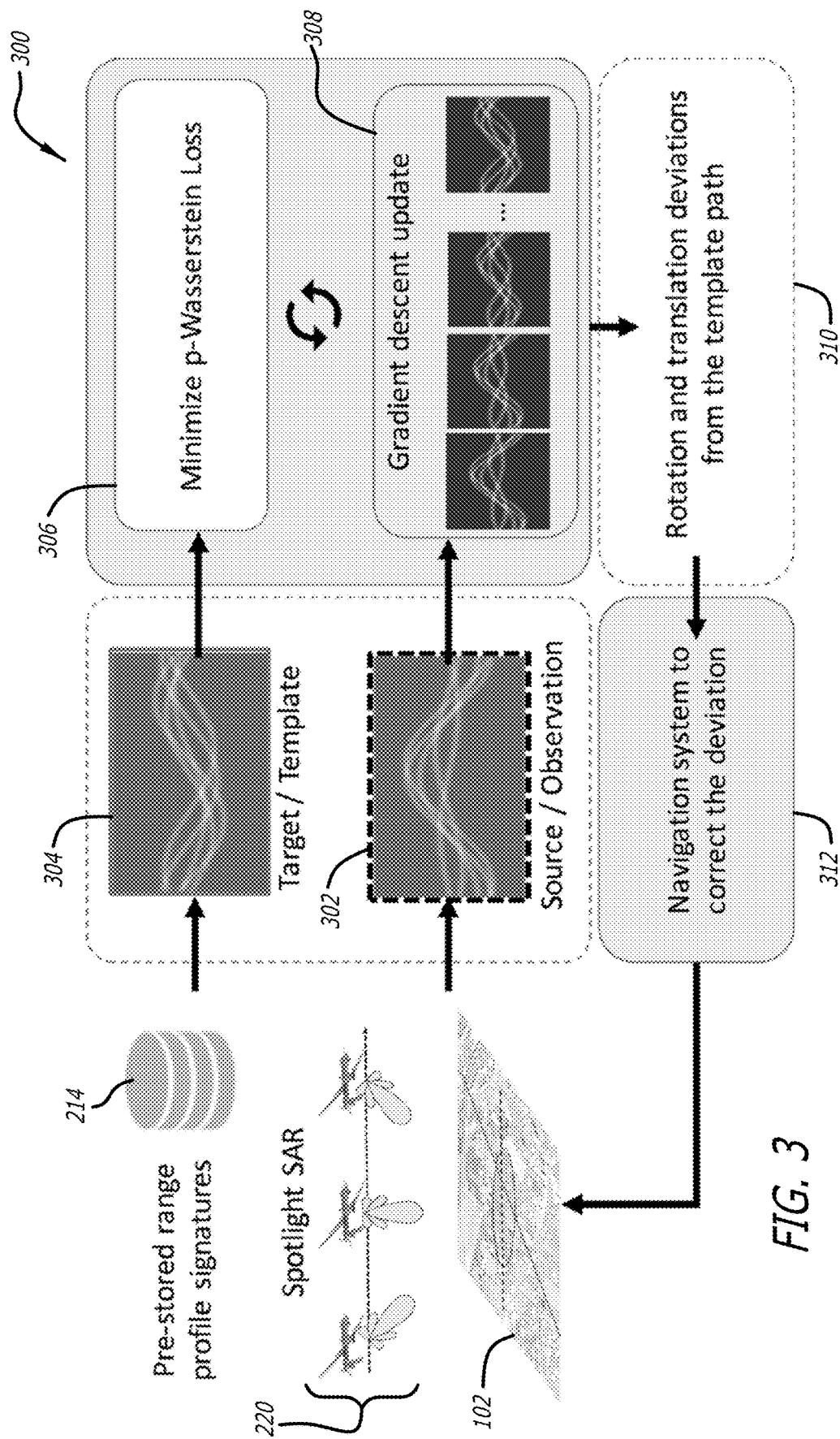
FIG. 3 illustrates a flow diagram of a SAR navigation system for navigation guidance in accordance with an example of the disclosure.

FIG. 3 illustrates a flow diagram of a SAR navigation system 300 for navigation guidance in accordance with an example of the disclosure. In some examples, SAR navigation system 300 includes a SAR sensor 220, processor 210, and memory 214. In some examples, SAR sensor 220 captures one or more SAR images of a scene 102. Processor 210 receives the SAR phase history data of the scene from the SAR sensor 220 operating in a spotlight mode. Processor 210 applies a radon transform to the SAR phase history data to generate observed range profile data 302.

In some examples, processor 210 receives template range profile data 304 of the scene from memory 214. In various examples, template range profile data 304 of one or more scenes is stored in memory 214 for use in navigation guidance. The template range profile data 304 comprises numerous projection angles of the scene. In some examples, template range profile data 304 comprises three hundred sixty projection angles. Fewer projection angles are possible in other template range profile data 304. In various examples, observed range profile data 302 comprises the same or fewer (e.g., a subset) of the projection angles of the template range profile data 304.

In various examples, processor 210 is adapted to compare the observed range profile data 302 to the template range profile data 304 of the scene. In this regard, processor 210 calculates a p-Wasserstein distance 306 corresponding to the observed range profile data 302 with respect to the template range profile data 304. The p-Wasserstein distance is formulated as a p-Wasserstein loss function for the registration parameters. In some examples, the registration parameters include one of a rotation angle, a scaling, or an x,y translation of the observed range profile data 302 relative to the template range profile data 304.

In some examples, processor 210 is adapted to estimate registration parameters associated with the observed range profile data 302 relative to the template range profile data 304. In this regard, processor 210 performs a gradient descent optimization 308 based on the p-Wasserstein distance 306. In various examples, the gradient descent optimization 308 includes one of a dual formulation of the optimization or a primal formulation of the optimization or a combination thereof. In some examples, estimation of the registration parameters is based on numerous iterations (e.g., a plurality) to calculate the p-Wasserstein distance 306 and perform the gradient descent optimization 308 based on the p-Wasserstein distance 306.

In various examples, the estimate of registration parameters is used to determine rotation and translation deviations 310 from the template range profile data 304. The rotation and translation deviations 310 can be used to adjust a navigation 312 of aerial vehicle 101.

In the spotlight mode SAR, the observed range profile data 302 is based on the radon transformation of the underlying image scene, I: $\mathbb{R}^2 \to \mathbb{R}^+$ (e.g., the reflectivity). The two-dimensional Radon transform, $\mathcal{R}: \mathbb{R} \times \mathbb{R} \to \mathbb{R} \times \mathbb{S}^1$ where $\mathbb{S}^1$ is the unit circle in $\mathbb{R}^2$, is a mapping from the image domain to its angular integration. More precisely, the Radon transform of image I: $\mathbb{R}^2 \to \mathbb{R}^+$, which is denoted by $J=\mathcal{R}(I)$, is defined as:

$$J(t,\theta)=\int_{-\infty}^{\infty}\int_{-\infty}^{\infty}I(x,y)\delta(t-x\cos(\theta)-y\sin(\theta))dxdy \quad (1)$$

where t is the perpendicular distance of a line from the origin and θ is the angle between the line and the y-axis. Furthermore, using the Fourier Slice Theorem, the inverse Radon transform is defined as, $I=\mathcal{R}^{-1}(J)$, $$I(x,y)=\int_0^\pi J(\bullet,\theta)*w(\bullet)\circ(x\cos(\theta)+\sin(\theta))d\theta \quad (2)$$

where $w=\mathcal{F}^{-1}(|\omega|)$ is the ramp filter, $\mathcal{F}^{-1}$ is the inverse Fourier transform, and $J(\bullet,\theta)*w(\bullet)$ is the one-dimensional convolution with respect to variable t. The following property of the Radon transform is used in derivations described herein, $$\int_{-\infty}^{\infty}\int_{-\infty}^{\infty}I(x,y)dxdy=\int_{-\infty}^{\infty}J(t,\theta)dt, \forall \theta \in [0,\pi] \quad (3)$$

which implies that $$\int_{-\infty}^{\infty}J(t,\theta_i)dt=\int_{-\infty}^{\infty}J((t,\theta_j),dt, \forall \theta_i,\theta_j \in \mathbb{S}^1 \quad (4)$$

The following relationships (e.g., equation (5)) hold for the Radon transformation, $$I(x, y) \quad (5)$$
$$I(x - x_0, y - y_0)$$
$$\alpha^2 I(\alpha x, \alpha y)$$

-continued $I(x\cos(\phi) + y\sin(\phi), y\cos(\phi) - x\sin(\phi))$ $\overset{\mathcal{R}}{\to} J(t, \theta)$ $\overset{\mathcal{R}}{\to} J(t - x_0\cos(\theta) - y_0\sin(\theta), \theta)$ $\overset{\mathcal{R}}{\to} \alpha J(\alpha t, \theta)$ $\overset{\mathcal{R}}{\to} J(t, \theta - \phi)$ $I_0$ and $I_1$ are the reflectivity of the pre-stored map and the observed underlying scene (note that only the corresponding range profile J1 is observed and not the actual reflectivity). $I_1$ and $I_0$ are related via an affine transformation $I_1(x,y)=I_0(u,v)$, where $$\begin{bmatrix} u \\ v \end{bmatrix} = \begin{bmatrix} a_{00}x + a_{01}y + x_0 \\ a_{10}x + a_{11}y + y_0 \end{bmatrix} \quad (6)$$

In various examples, the estimated registration parameters are $A=[[\alpha_{00}, \alpha_{0,1}], [\alpha_{10}, \alpha_{11}]]$ and $[x_0, y_0]$ from $J_0$ and $J_1$. Using the simplifying assumption that the affine transformation only contains rotation, translation, and scaling (no shear) the transformation parameters become $A=[[\alpha \cos(\phi), \alpha \sin(\phi)], [-\alpha \sin(\phi), \alpha \cos(\phi)]]$ and $[x_0, y_0]$, and the relationship between $J_1$ and $J_0$ is, $$J_1(t,\theta)=\alpha J_0(\alpha(t-x_0\cos(\theta)-y_0\sin(\theta)),\theta-\phi) \quad (7)$$

Equation (7) together with equation (4) imply that:

$$\int_{\mathbb{R}} J_1(t,\theta_i)dt = \int_{\mathbb{R}} \alpha J_0(\alpha(t-x_0\cos(\theta_j)-y_0\sin(\theta_j)),\theta_j-\phi)$$
$$dt, \forall \theta_i, \theta_j \in \mathbb{S}^1 \quad (8)$$

The following minimization (e.g., equation (9)) is solved:

$$\text{argmin}_{\alpha,\phi,x_0,y_0} \int_{\mathbb{S}_1} d(J_1(t,\theta),\alpha J_0(\alpha(t-x_0\cos(\theta)-y_0\sin(\theta)),\theta-\phi))d\theta \quad (9)$$

where $d(.,.)$ is a metric between two one-dimensional signals (e.g. the Euclidean distance).

Equation (10) provides the p-Wasserstein distance used in the estimation of registration parameters. In one example, the one-dimensional signals are represented as probability density functions (pdfs), the pdfs being positive and normalized to sum to one. For pdfs $J_0$ and $J_1$, these distances are defined by equation (10):

$$p-\text{Wasserstein: } W_p(J_0, J_1) = \left(\int_0^1 (F_0^{-1}(u) - F_1^{-1}(u))^p du\right)^{\frac{1}{p}} \quad (10)$$

where $F_i(t) = \int_{-\infty}^t J_i(\tau)d\tau$

The p-Wasserstein distance is calculated between two one-dimensional pdfs, therefore, it has the closed form solution written above in equation (10). In order to compare the efficiency of these distances in equation (9), the energy landscape of the loss function in equation (9) is determined with respect to each parameter.

For the rotation parameter, $I_1$ is a rotated version of $I_0$ and $\phi$ is the rotation parameter. In this example, equation (9) simplifies to minimizing the following loss function:

$$L(\phi)= \int_{\mathbb{S}_1} d(J_1(t,\theta), J_0(t,\theta-\phi))d\theta \quad (11)$$

Figure 4:
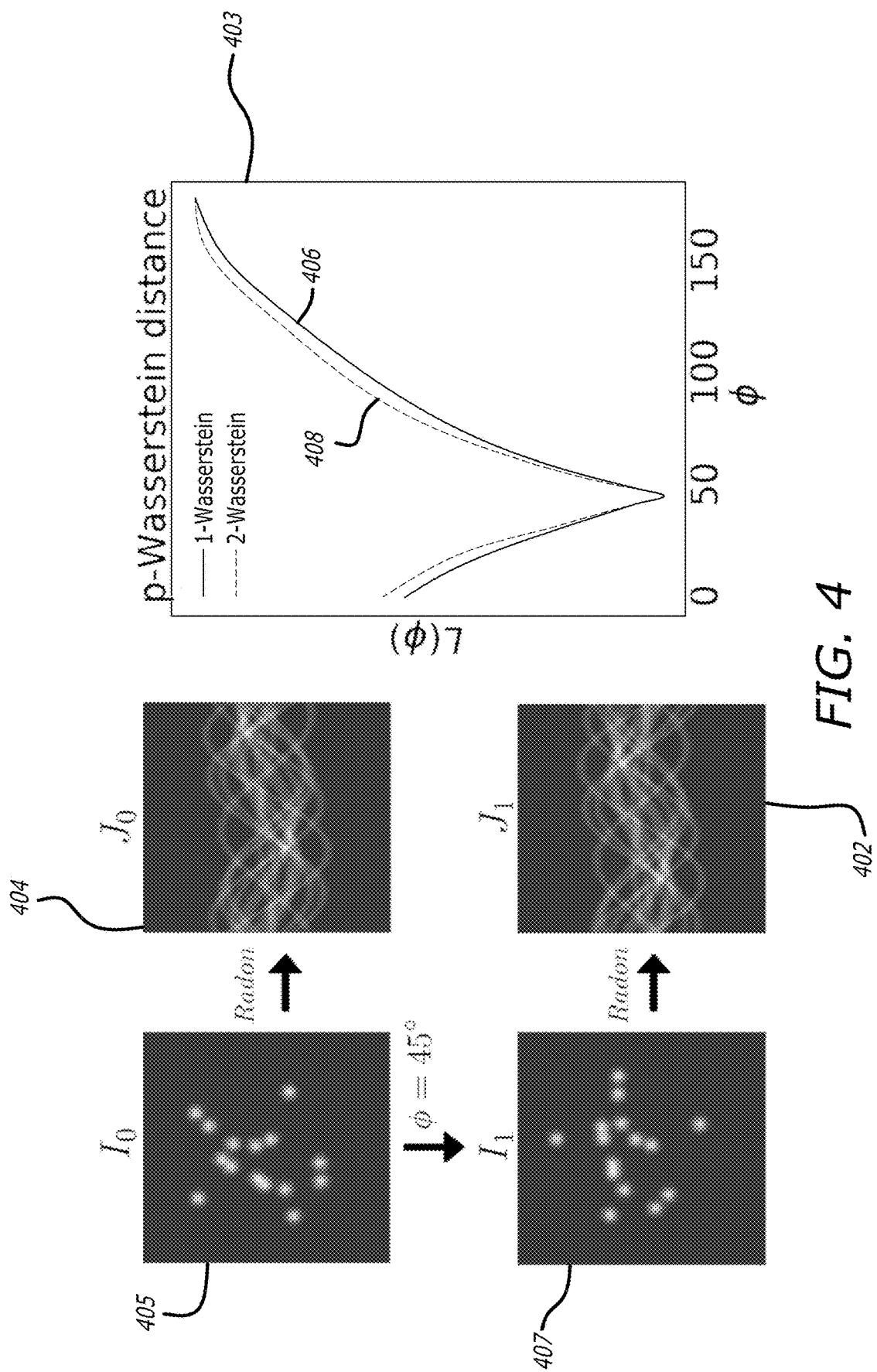
FIG. 4 illustrates an energy landscape of a rotation loss function with respect to a p-Wasserstein distance in accordance with an example of the disclosure.

Referring to FIG. 4, a plot of $L(\phi)$ with respect to distances in equation (10) is illustrated for range profiles $J_0$ and $J_1$ shown in FIG. 4. For example, $I_0$ and $I_1$ (e.g., template image data 405 and observed image data 407, respectively) are the reflectivity of the pre-stored map and the observed underlying scene, and $J_0$ and $J_1$ are the Radon transformed range profiles (e.g., template range profile data 404 and observed range profile data 402, respectively). As illustrated, the y-axis is the function $L(\phi)$ and the x-axis is the rotation parameter $\phi$.

In the example shown in FIG. 4, $I_1$ is rotated forty five degrees from $I_0$ (e.g., as shown by $\phi=45°$ in FIG. 4). Plot 403 of FIG. 4 shows $L(\phi)$ with respect to the Wasserstein distances. The plots of 1-Wasserstein distance 406 and 2-Wasserstein distance 408 shows that the Wasserstein distances provide a smooth energy landscape with no local optima.

For the scaling parameter, $I_1$ is a scaled version of $I_0$, and $\alpha$ is the scaling parameter. In this example, equation (9) simplifies to minimizing the following loss function:

$$L(\alpha)= \int_{\mathbb{S}_1} d(J_1(t,\theta),\alpha J_0(\alpha t,\theta))d\theta \quad (12)$$

Figure 5:
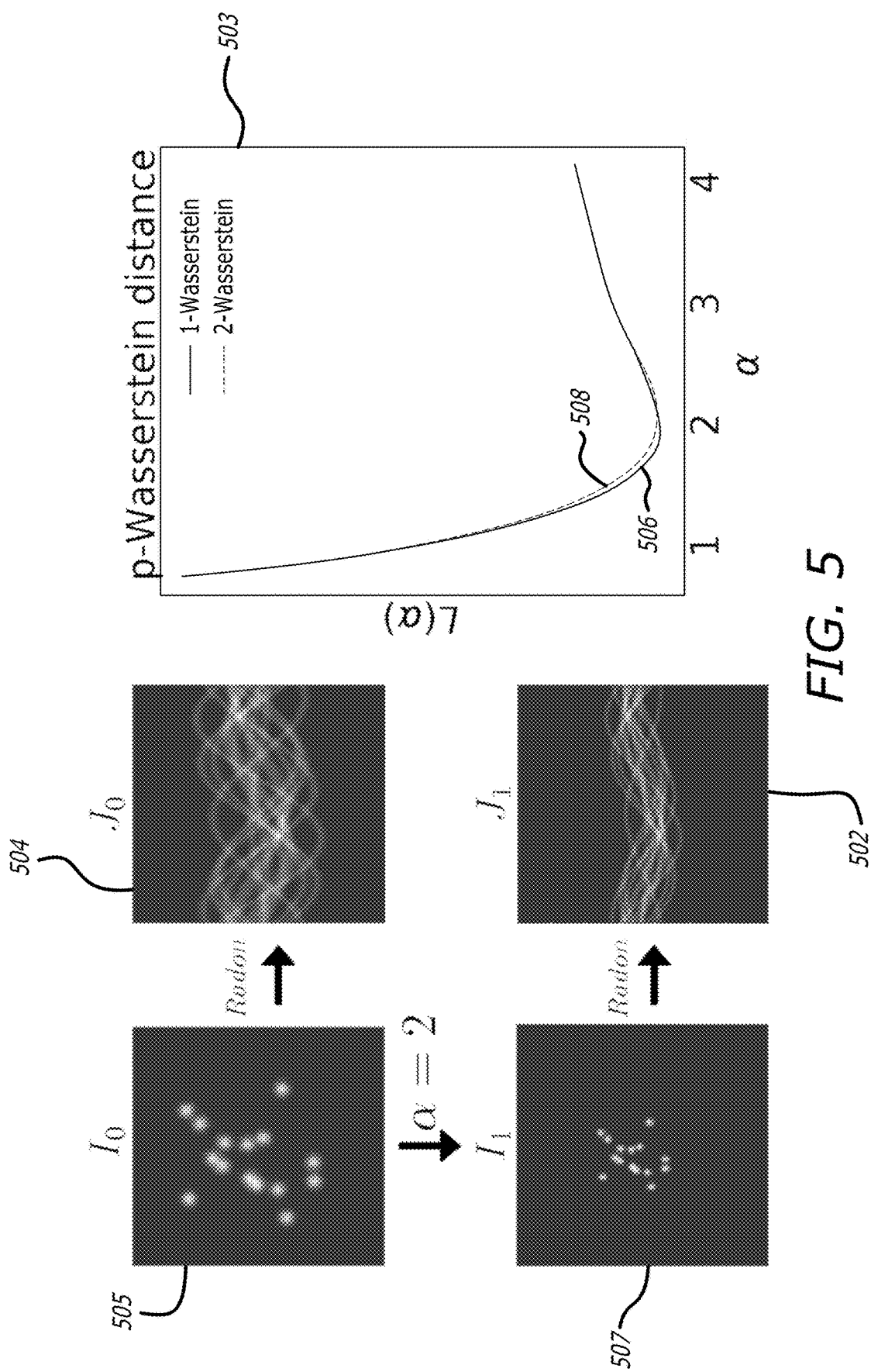
FIG. 5 illustrates an energy landscape of a scaling loss function with respect to a p-Wasserstein distance in accordance with an example of the disclosure.

Referring to FIG. 5, a plot of $L(\alpha)$ for the distances presented in equation (10) is illustrated for the range profiles $J_0$ and $J_1$. For example, $I_0$ and $I_1$ (e.g., template image data 505 and observed image data 507, respectively) are the reflectivity of the pre-stored map and the observed underlying scene, and $J_0$ and $J_1$ are the Radon transformed range profiles (e.g., template range profile data 504 and observed range profile data 502, respectively). As illustrated, the y-axis is the function $L(\alpha)$ and the x-axis is the scaling parameter $\alpha$.

In the example shown in FIG. 5, $I_1$ is scaled by a factor of two from $I_0$ (e.g., as shown by $\alpha=2$ in FIG. 5). Plot 503 of FIG. 5 shows $L(\alpha)$ with respect to the Wasserstein distances. The plots of 1-Wasserstein distance 506 and 2-Wasserstein distance 508 show that the Wasserstein distances provide a smooth energy landscape with no local optima, for which a gradient descent optimization efficiently converges regardless of where on the Wasserstein distance the gradient descent optimization is initialized.

For the translation parameter, $I_1$ is a translated version of $I_0$, and $x_0, y_0$ are the translation parameters. In this example, equation (9) simplifies to minimizing the following loss function:

$$L(x_0,y_0)= \int_{\mathbb{S}_1} dJ_1(t,\theta), J_0(t-x_0\cos(\theta)-y_0\sin(\theta),\theta))d\theta \quad (13)$$

Figure 6:
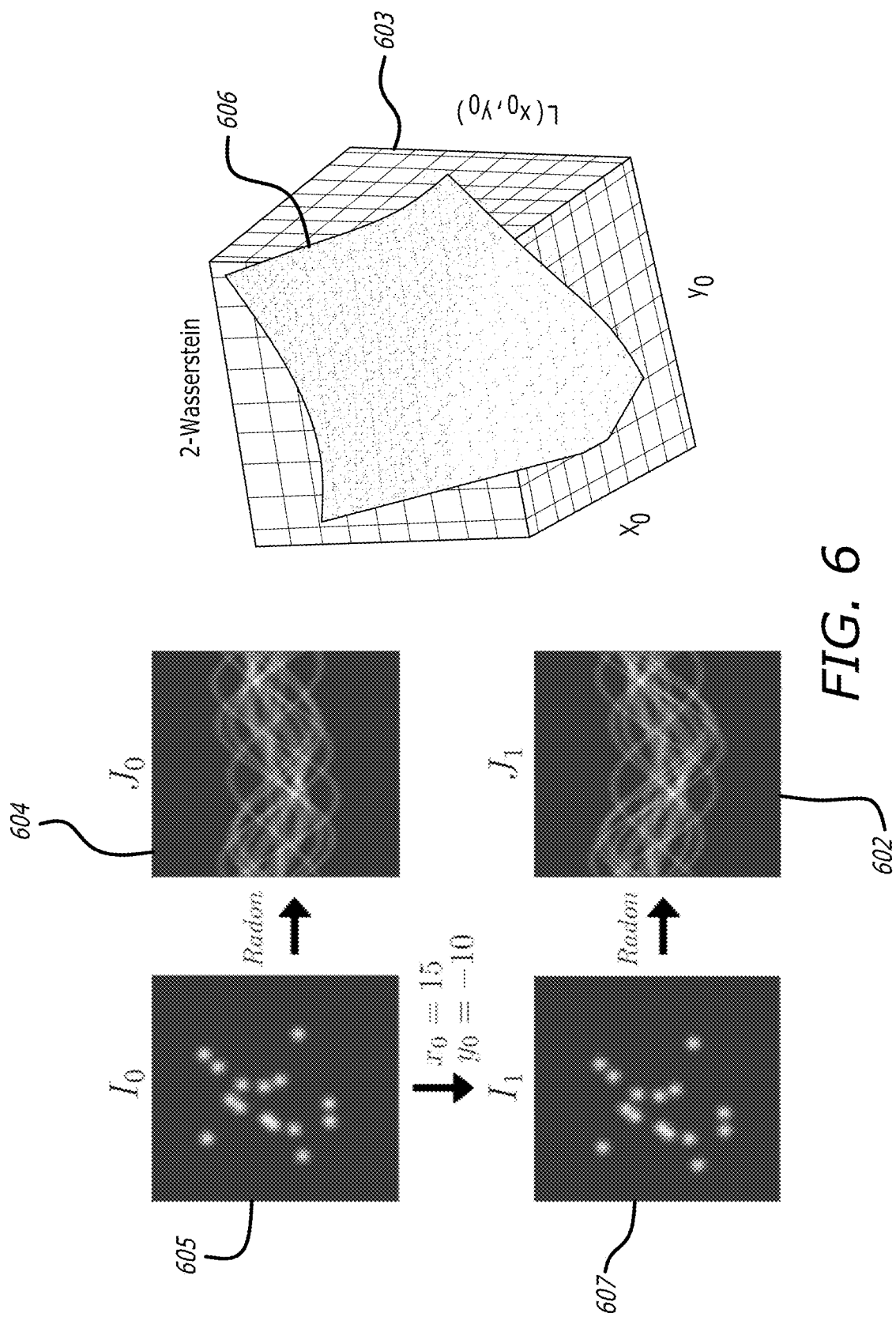
FIG. 6 illustrates an energy landscape of a translation loss function with respect to a p-Wasserstein distance in accordance with an example of the disclosure.

Referring to FIG. 6, a plot of $L(x_0, y_0)$ for the distances presented in equation (10) is illustrated for the range profiles $J_0$ and $J_1$. For example, $I_0$ and $I_1$ (e.g., template image data 605 and observed image data 607, respectively) are the reflectivity of the pre-stored map and the observed underlying scene, and $J_0$ and $J_1$ are the Radon transformed range profiles (e.g., template range profile data 604 and observed range profile data 602, respectively). As illustrated, the z-axis is the function $L(x_0,y_0)$, the x-axis is the translation parameter $x_0$, and the y-axis is the translation parameter $y_0$.

In the example shown in FIG. 6, $I_1$ is translated by $x_0$ equal to fifteen pixels and $y_0$ equal to minus ten pixels from $I_0$ (e.g., as shown by $\alpha=2$ in FIG. 5). Plot 603 of FIG. 6 shows $L(x_0,y_0)$ with respect to the 2-Wasserstein distance. The plot of the 2-Wasserstein distance 606 shows that the Wasserstein distance provides a smooth energy landscape with no local optima.

FIGS. 4-6 demonstrate that all distances have the same global optima, and therefore an exhaustive parameter search need not be used with any of these distances to find the registration parameters. An exhaustive search is computationally expensive and defeats the purpose of efficiently determining registration parameters in real time or near real time. The Wasserstein distance produces energy landscapes that have a single global minimum corresponding to the correct registration parameters (e.g., optimal values for one or more of the registration parameters), and is smooth (e.g., as the registration parameters vary, the Wasserstein distance metric and its derivative change slowly). Given the smooth, convex-like energy landscape of the Wasserstein distances with a single global minimum, a gradient descent optimization can be used as an efficient alternative to an exhaustive search to find the optimal registration parameters, as illustrated in the non-limiting examples of FIGS. 4-6.

Figure 7:
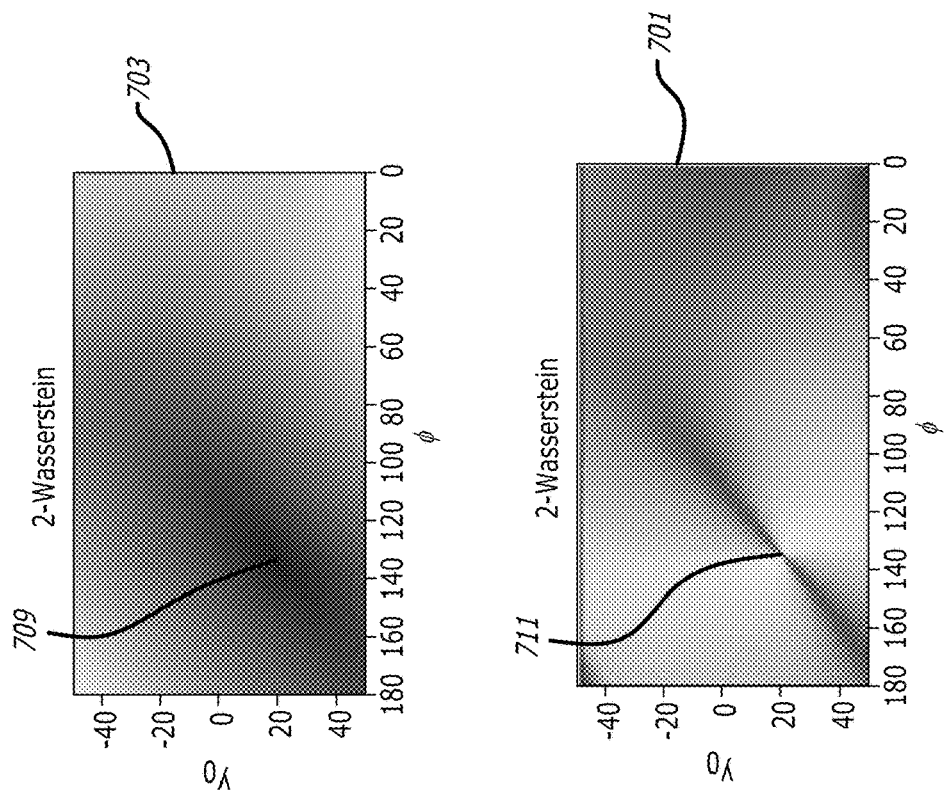
FIG. 7 illustrates a joint energy landscape of a rotation and translation parameter loss function with respect to a p-Wasserstein distance and its corresponding norm of gradient in accordance with an example of the disclosure.
Figure 7:
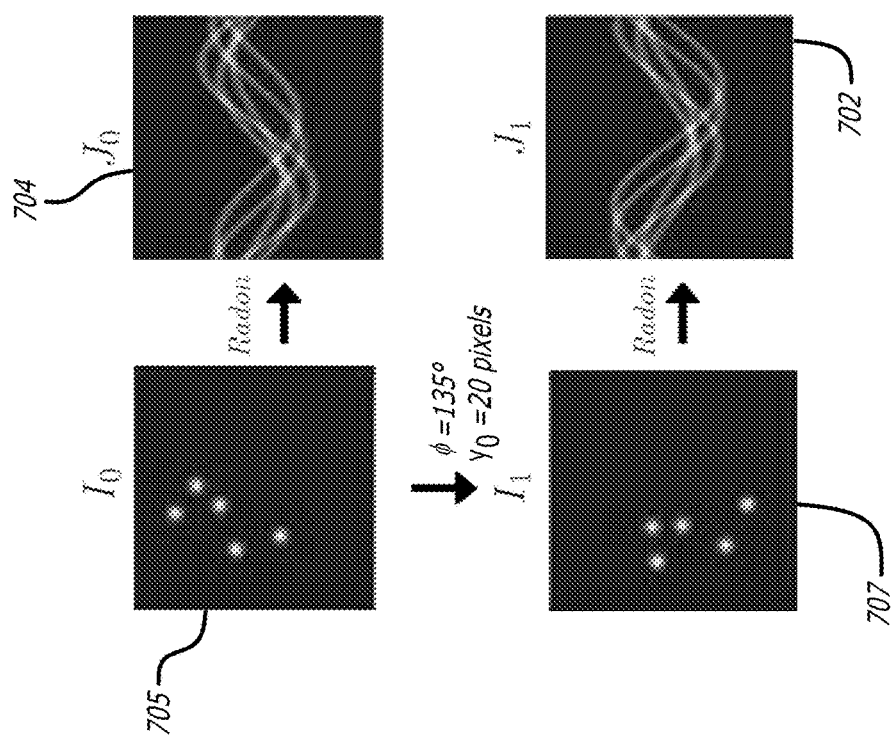

FIG. 7 illustrates a joint energy landscape of a rotation and translation parameter function with respect to a p-Wasserstein distance and its corresponding norm of gradient in accordance with an example of the disclosure. For example, the rotation and translation function is given by equation (14):

$$L(\phi, y_0) = \int_{S_1} d(J_1(t,\theta), J_0(t - y_0 \sin(\theta), \theta - \phi)) d\theta \quad (14)$$

Referring to FIG. 7, in one example, a plot of $L(\phi, y_0)$ for the distances presented in equation (10) is illustrated for the range profiles $J_0$ and $J_1$. For example, $I_0$ and $I_1$ (e.g., template image data 705 and observed image data 707, respectively) are the reflectivity of the pre-stored map and the observed underlying scene, and $J_0$ and $J_1$ are the Radon transformed range profiles (e.g., template range profile data 704 and observed range profile data 702, respectively). $I_1$ is rotated by one hundred thirty five degrees and is translated by twenty pixels in the $y_0$ direction. As illustrated in plot 703, the x-axis is the rotation parameter $\phi$, and the y-axis is the translation parameter $y_0$ of the 2-Wasserstein distance. Plot 703 distinctly shows a point of minimum energy 709.

As shown in FIG. 7, the norm of the gradients of the energy landscapes (e.g., $|\nabla L(\phi, y_0)|$ of the 2-Wasserstein distance is illustrated in plot 701. As illustrated, the x-axis is the rotation parameter $\phi$, and the y-axis is the translation parameter $y_0$. Plot 701 shows a point of minimum energy 711, which aligns with point of minimum energy 709 of plot 703. In this regard, the joint energy landscape is a smooth landscape that benefits from the 2-Wasserstein distance, enabling a joint gradient descent optimization for use in determining the registration parameter.

Figure 8:
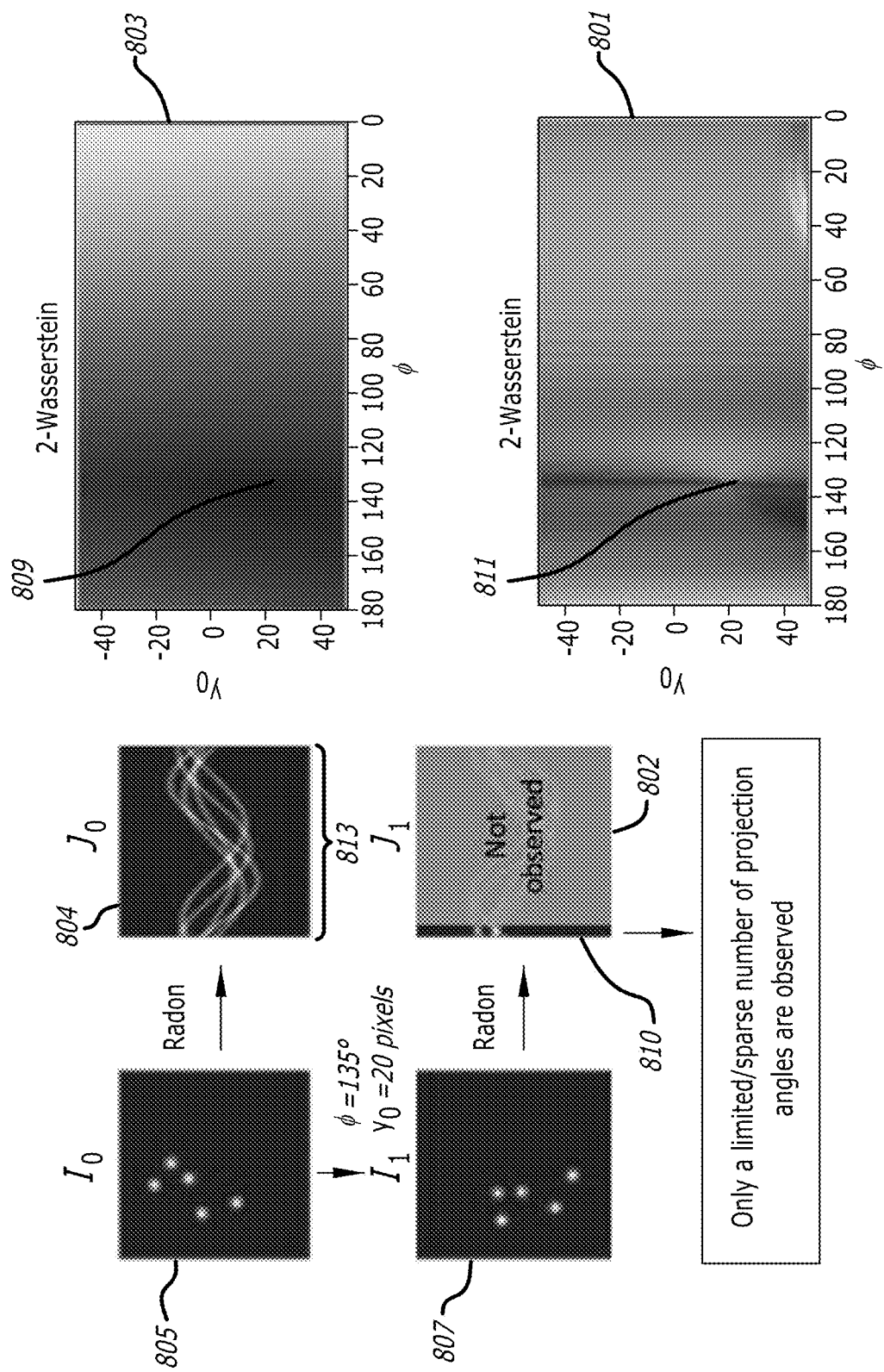
FIG. 8 illustrates an energy landscape of a rotation and translation parameter loss function with respect to a 2-Wasserstein distance and its corresponding norm of gradient for a limited (e.g., sparse) number of projection angles in accordance with an example of the disclosure.

FIG. 8 illustrates an energy landscape of a rotation and translation parameter function with respect to a 2-Wasserstein distance and its corresponding norm of gradient for a limited (e.g. sparse) number of projection angles in accordance with an example of the disclosure. FIG. 8 illustrates the energy landscape of $L(\phi, y_0)$ of FIG. 7 for a limited number of observed projection angles. In this regard, FIG. 8 replicates the results shown in FIG. 7, but with limited projection angles. For example, template range profile data 804 includes a full complement of projection angles 813 and observed range profile data 802 includes a limited number of projection angles 810 (e.g., a subset of the projection angles 813).

Referring to FIG. 8, $I_0$ and $I_1$ (e.g., template image data 805 and observed image data 807, respectively) are the reflectivity of the pre-stored map and the observed underlying scene with $I_1$ rotated from $I_0$ by one hundred thirty five degrees and translated in the $y_0$ direction by twenty pixels. In the example shown in FIG. 8, a plot of $L(\phi, y_0)$ for the distances presented in equation (10) is illustrated for the range profiles $J_0$ and $J_1$. $J_0$ is the radon transformed template range profile data 804 including full projection angles (e.g., three hundred sixty projection angles), and $J_1$ is the Radon transformed observed range profile data 802 including limited projection angles (e.g., ten projection angles in this example). As illustrated, the x-axis is the rotation parameter $\phi$, and the y-axis is the translation parameter $y_0$ of the 2-Wasserstein distance. Plot 803 (e.g., using limited projection angles) distinctly shows a point of minimum energy 809 at coordinates similar to point of minimum energy 709 of plot 703 in FIG. 7.

As shown in FIG. 8, the norm of the gradients of the energy landscapes (e.g., $|\nabla\nabla L(\phi, y_0)|$) of the 2-Wasserstein distance is illustrated in plot 801. As illustrated, the x-axis is the rotation parameter $\phi$, and the y-axis is the translation parameter $y_0$. Plot 801 shows a point of minimum energy 811, which aligns with point of minimum energy 711 of plot 701 of FIG. 7. In this regard, by comparing FIG. 7 and FIG. 8, the Wasserstein distance provides an accurate estimate of registration parameters using only a limited number of projection angles.

In some examples, the gradient descent optimization uses a primal formulation to estimate registration parameters. For example, an alternative for the p-Wasserstein formulation, the Monge formulation, is used for one dimensional signals, and is defined by equation (15) below as:

$$W_p(J_0, J_1) = \left(\int_{\mathbb{R}} |f(t) - t|^p J_0(t) dt\right)^{\frac{1}{p}} \quad (15)$$

where $\frac{\partial f(t)}{\partial t} J_1(f(t)) = J_0(t)$, and the transport map has the following closed form solution, $f(t) = F_1^{-1}(F_0(t))$. Note that the Monge formulation is equivalent to the definition provided in equation (10). The dual formulation of the p-Wasserstein distance is defined in equation (16) as:

$$W_p(J_0, J_1) = \left(\int_{\mathbb{R}} \psi(t) J_0(t) dt - \int_{\mathbb{R}} \psi^c(t) J_1(t) dt\right)^{\frac{1}{p}} \quad (16)$$

where $\psi^c(t) := \inf_x\{\psi(x) - |x-t|^p\}$ and for p equal to 2 the potential field $\psi$ satisfies $$\frac{\partial^2 \psi(t)}{\partial t^2} J_1\left(\frac{\partial \psi(t)}{\partial t}\right) = J_0(t),$$

or in other words, $$f(t) = \frac{\partial \psi(t)}{\partial t}.$$

Using the primal formulation of the p-Wasserstein distance, the optimization in equation (9) is rewritten as:

$$\operatorname{argmin}_{\alpha, \phi, x_0, y_0} \int_{S_1} \int_{\mathbb{R}} |f(t, \theta) - t|^p \hat{J}_0(t, \theta; \alpha, \phi, x_0, y_0)) dt d\theta \quad (17)$$

such that, $$\frac{\partial f(t, \theta)}{\partial t} J_1(f(t, \theta), \theta) = \hat{J}_0(t, \theta; \alpha, \phi, x_0, y_0) \quad (18)$$

where $\hat{J}_0(t,\theta; \alpha, \phi, x_0, y_0) = \alpha J_0(\alpha(t-x_0 \cos(\theta) - y_0 \sin(\theta)), \theta-\phi)$. The above optimization can be solved iteratively through an Expectation Maximization approach following the steps:

1. Find the transport map f(t,θ) that satisfies equation (18).
2. Update parameters α, φ, $x_0$, and $y_0$.
3. Jump to step 1.

The update equations for the primal formulation are as follows:

$$\begin{cases} \alpha \leftarrow \alpha - \epsilon \int_{\mathbb{S}^1} \int_{\mathbb{R}} |f(t, \theta) - t|^p \frac{\partial \hat{J}_0(t, \theta; \alpha, \phi, x_0, y_0)}{\partial \alpha} dt d\theta \\ \phi \leftarrow \phi - \epsilon \int_{\mathbb{S}^1} \int_{\mathbb{R}} |f(t, \theta) - t|^p \frac{\partial \hat{J}_0(t, \theta; \alpha, \phi, x_0, y_0)}{\partial \phi} dt d\theta \\ x_0 \leftarrow x_0 - \epsilon \int_{\mathbb{S}^1} \int_{\mathbb{R}} |f(t, \theta) - t|^p \frac{\partial \hat{J}_0(t, \theta; \alpha, \phi, x_0, y_0)}{\partial x_0} dt d\theta \\ y_0 \leftarrow y_0 - \epsilon \int_{\mathbb{S}^1} \int_{\mathbb{R}} |f(t, \theta) - t|^p \frac{\partial \hat{J}_0(t, \theta; \alpha, \phi, x_0, y_0)}{\partial y_0} dt d\theta \end{cases} \quad (19)$$

where $\in$ is the gradient descent optimization step.

Using the dual formulation, for p equal to 2, as defined in equation (16), the optimization is as follows:

$$\text{argmin}_{\alpha,\phi,x_0,y_0} \int_{\mathbb{S}} \int_{\mathbb{R}} \psi(t,\theta) \int_{\mathbb{R}} (t,\theta;\alpha,\phi,x_0,y_0) dt d\theta \quad (20)$$

where ψ is the transport potential field. Note that the second term in equation (16) does not depend on the optimization parameters and hence is dropped. The above optimization is then solved iteratively following the steps below:

1. Find the transport map f(t,θ) that satisfies equation (18).
2. Calculate $\psi(t, \theta) = \int_{-\infty}^{t} f(\tau,\theta) d\tau$.
3. Update parameters α, φ, $x_0$, and $y_0$.

The update equations for the dual formulation are as follows:

$$\begin{cases} \alpha \leftarrow \alpha - \epsilon \int_{\mathbb{S}^1} \int_{\mathbb{R}} \psi(t, \theta) \frac{\partial \hat{J}_0(t, \theta; \alpha, \phi, x_0, y_0)}{\partial \alpha} dt d\theta \\ \phi \leftarrow \phi - \epsilon \int_{\mathbb{S}^1} \int_{\mathbb{R}} \psi(t, \theta) \frac{\partial \hat{J}_0(t, \theta; \alpha, \phi x_0, y_0)}{\partial \phi} dt d\theta \\ x_0 \leftarrow x_0 - \epsilon \int_{\mathbb{S}^1} \int_{\mathbb{R}} \psi(t, \theta) \frac{\partial \hat{J}_0(t, \theta; \alpha, \phi, x_0, y_0)}{\partial x_0} dt d\theta \\ y_0 \leftarrow y_0 - \epsilon \int_{\mathbb{S}^1} \int_{\mathbb{R}} \psi(t, \theta) \frac{\partial \hat{J}_0(t, \theta; \alpha, \phi, x_0, y_0)}{\partial y_0} dt d\theta \end{cases} \quad (21)$$

where $\in$ is the gradient descent optimization step.

Figure 9:
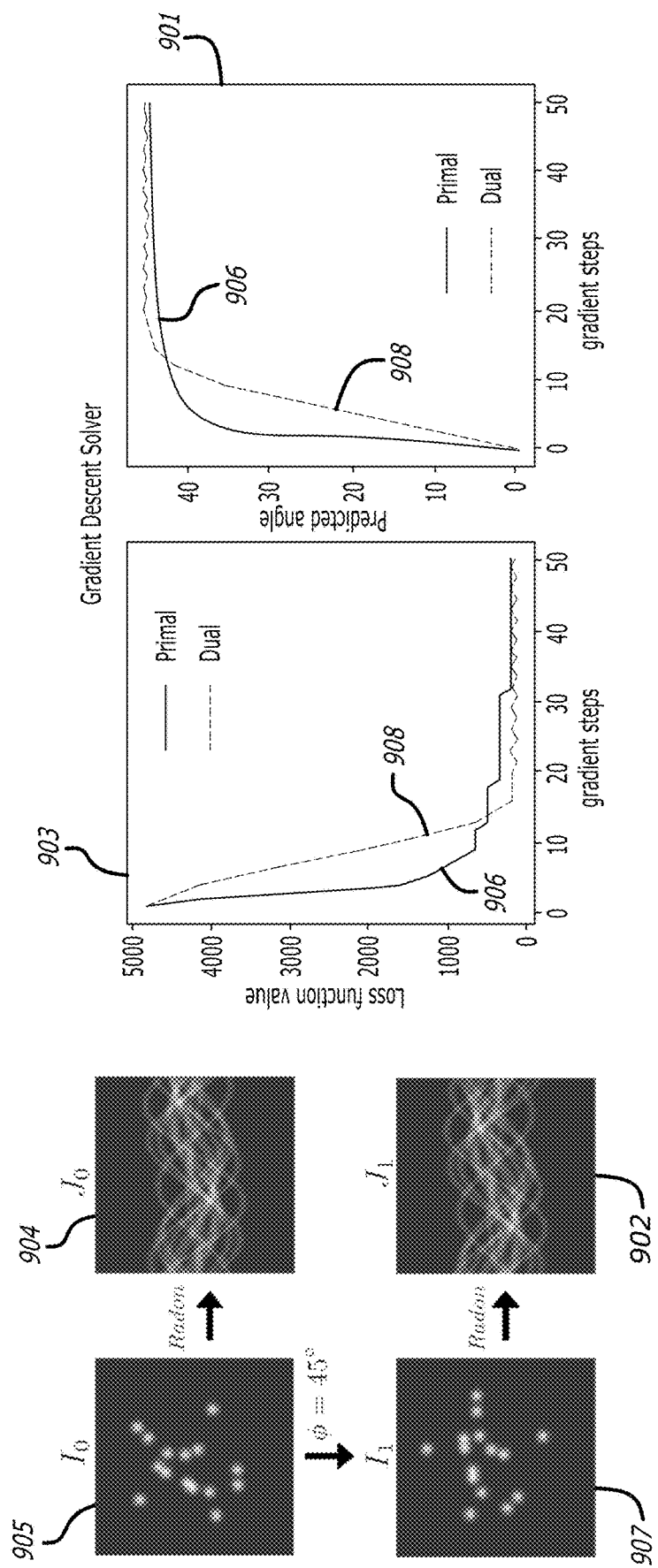
FIG. 9 illustrates plots of a loss function value and a predicted rotation angle for primal and dual gradient descent optimization steps in accordance with an example of the disclosure.

FIG. 9 illustrates plots of a loss function value and a predicted rotation angle for primal and dual gradient descent optimization steps in accordance with an example of the disclosure. For example, $I_0$ and $I_1$ (e.g., template image data 905 and observed image data 907, respectively) are the reflectivity of the pre-stored map and the observed underlying scene, and $J_0$ and $J_1$ are the Radon transformed range profiles (e.g., template range profile data 904 and observed range profile data 902, respectively). Plot 903 illustrates a comparison of the primal formulation and the dual formulation for iterations of gradient steps to minimize the loss function value. Plot 901 illustrates a comparison of primal formulation and dual formulation for gradient steps to predict the rotation angle. The original rotation angle was forty five degrees and, as shown in Plot 901, the predicted angles after 50 iterations were 44:68 degrees for a primal formulation 906 and 45:03 degrees for a dual formulation 908. As shown by Plot 903, the dual formulation 908 converges to the minimum of the loss function more rapidly than the primal formulation 906. In addition, the dual formulation appears to be less sensitive to the gradient step size.

Figure 10:
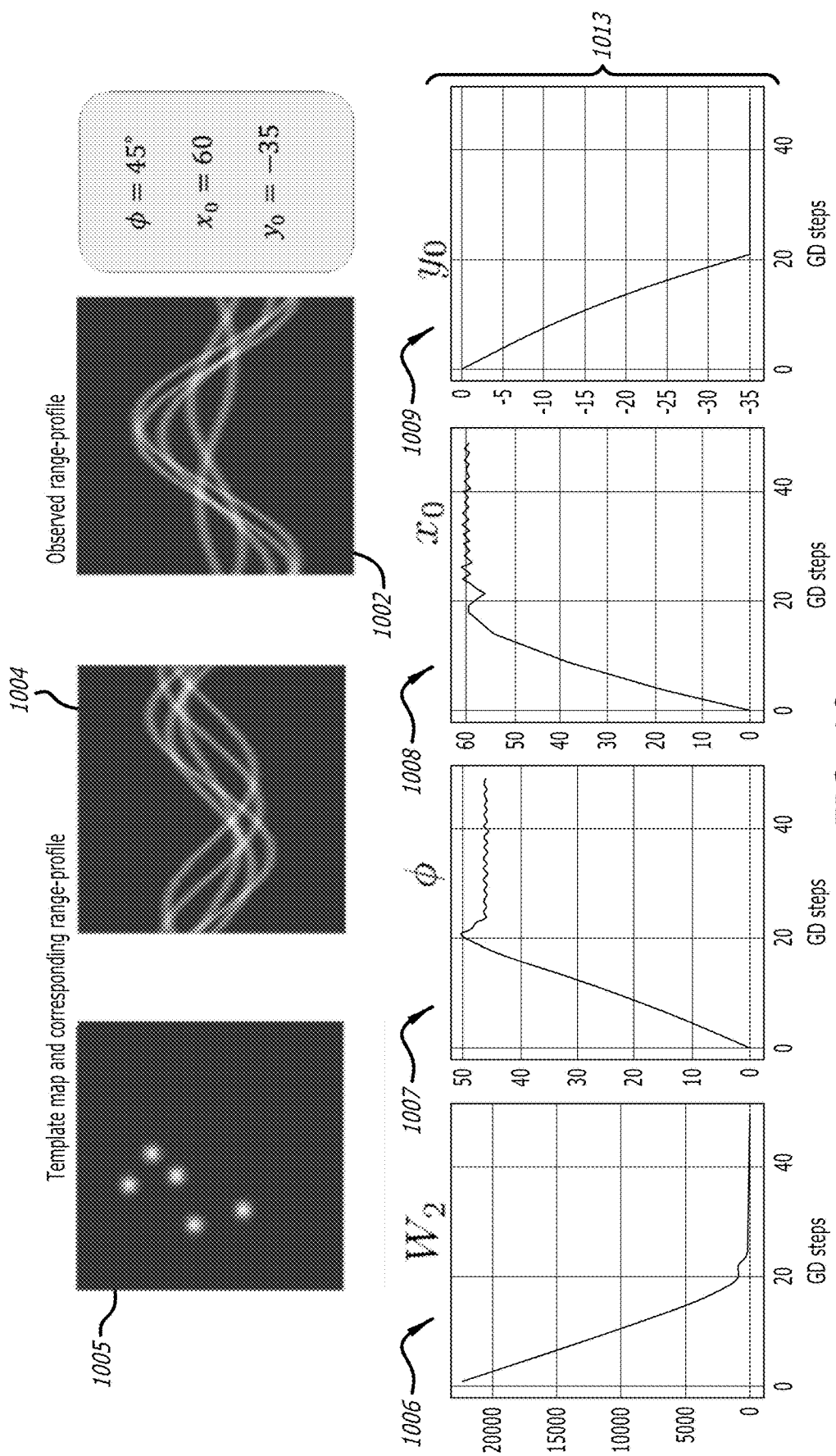
FIG. 10 illustrates a loss function, a predicted rotation angle, and predicted translations as a function of gradient steps in accordance with an example of the disclosure.

Referring to FIG. 10, in one example, a gradient descent optimization estimates a rotation angle and translation parameters efficiently and accurately from template image data 1005. In this regard, the gradient descent optimization is used as a joint gradient descent optimization to estimate two or more registration parameters 1013 (e.g., a rotation φ and a translation $x_0$ and $y_0$) from a joint energy landscape of a rotation and translation parameter function with respect to a Wasserstein distance. FIG. 10 shows template image data 1005 and template range profile data 1004, and observed range profile data 1002 is rotated by forty five degrees and translated by $x_0$ equal to 60 pixels and $y_0$ equal to 35 pixels relative to template range profile data 1004 (e.g., where the original images are 256 by 256 pixels).

As illustrated in FIG. 10, plot 1006 shows a loss function value of the Wasserstein distance, where the gradient descent optimization converges to the minimum of the loss function in approximately 22 gradient steps (e.g., gradient (GD) steps of plot 1006). Plot 1007 shows that the rotation angle (φ) is predicted at approximately forty five degrees in approximately twenty two gradient steps (e.g., GD steps of plot 1007). Plot 1008 and plot 1009 show that the $x_0$ and $y_0$ translation is predicted at approximately sixty pixels and minus thirty five pixels, respectively, at approximately twenty two gradient steps (e.g., GD steps of plot 1008 and plot 1009). As shown, the joint gradient descent optimization recovers the rotation and translation parameters with high accuracy after less than fifty iterations.

Figure 11:
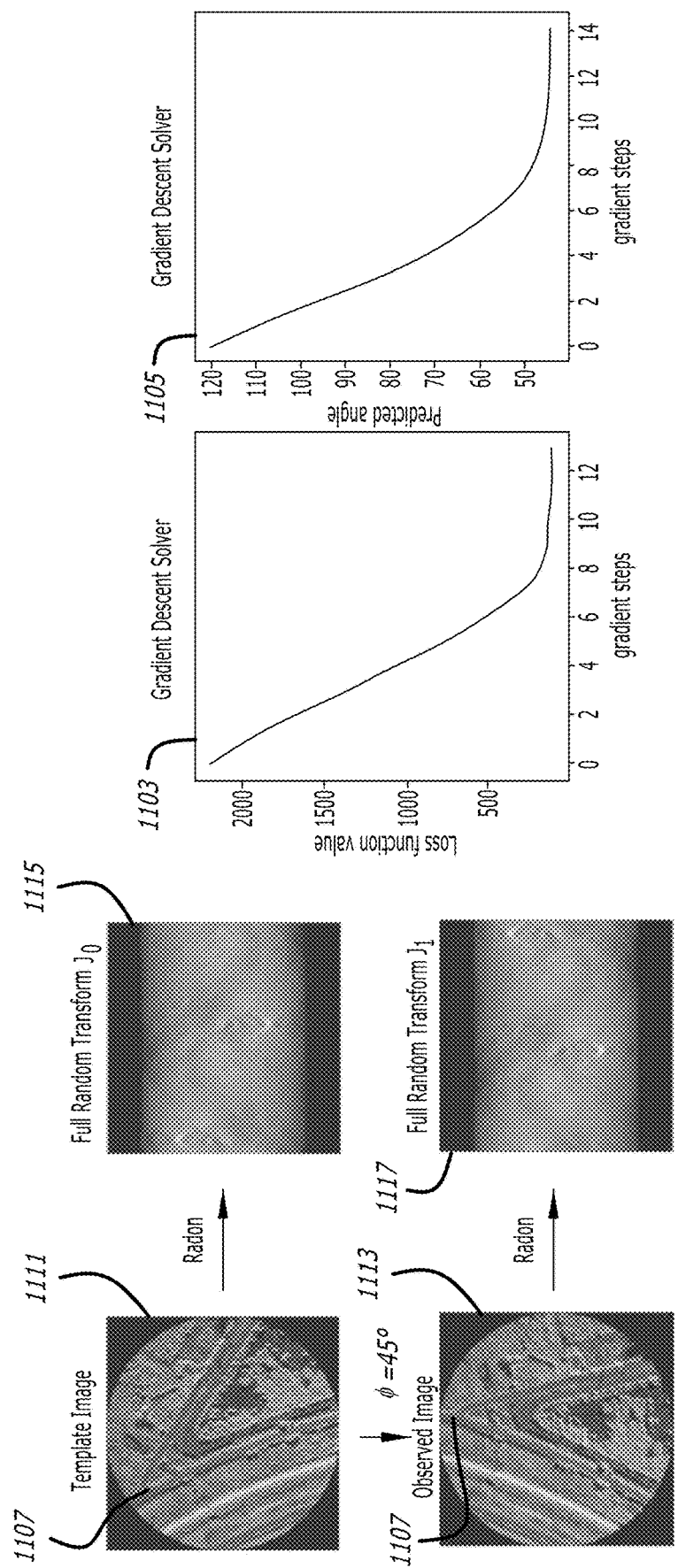
FIG. 11 illustrates estimating a rotation angle using a gradient descent optimization in accordance with an example of the disclosure.

FIG. 11 illustrates estimating a rotation angle using a gradient descent optimization in accordance with an example of the disclosure. In the non-limiting example illustrated in FIG. 11, pairs of SAR images (e.g., a temple image data 1111 and an observed image data 1113) are constructed from SAR phase history data that includes a feature 1107 rotated by forty five degrees at observed image data 1113. A radon transform is applied to the images to obtain range profile data (e.g., a template range profile data 1115 and an observed range profile data 1117).

As shown in FIG. 11, a plot 1103 of the loss function and a plot 1105 of an estimated rotation angle shows that the gradient descent optimization converges to a predicted angle of 44:16 degrees after approximately 14 iterations.

Figure 12:
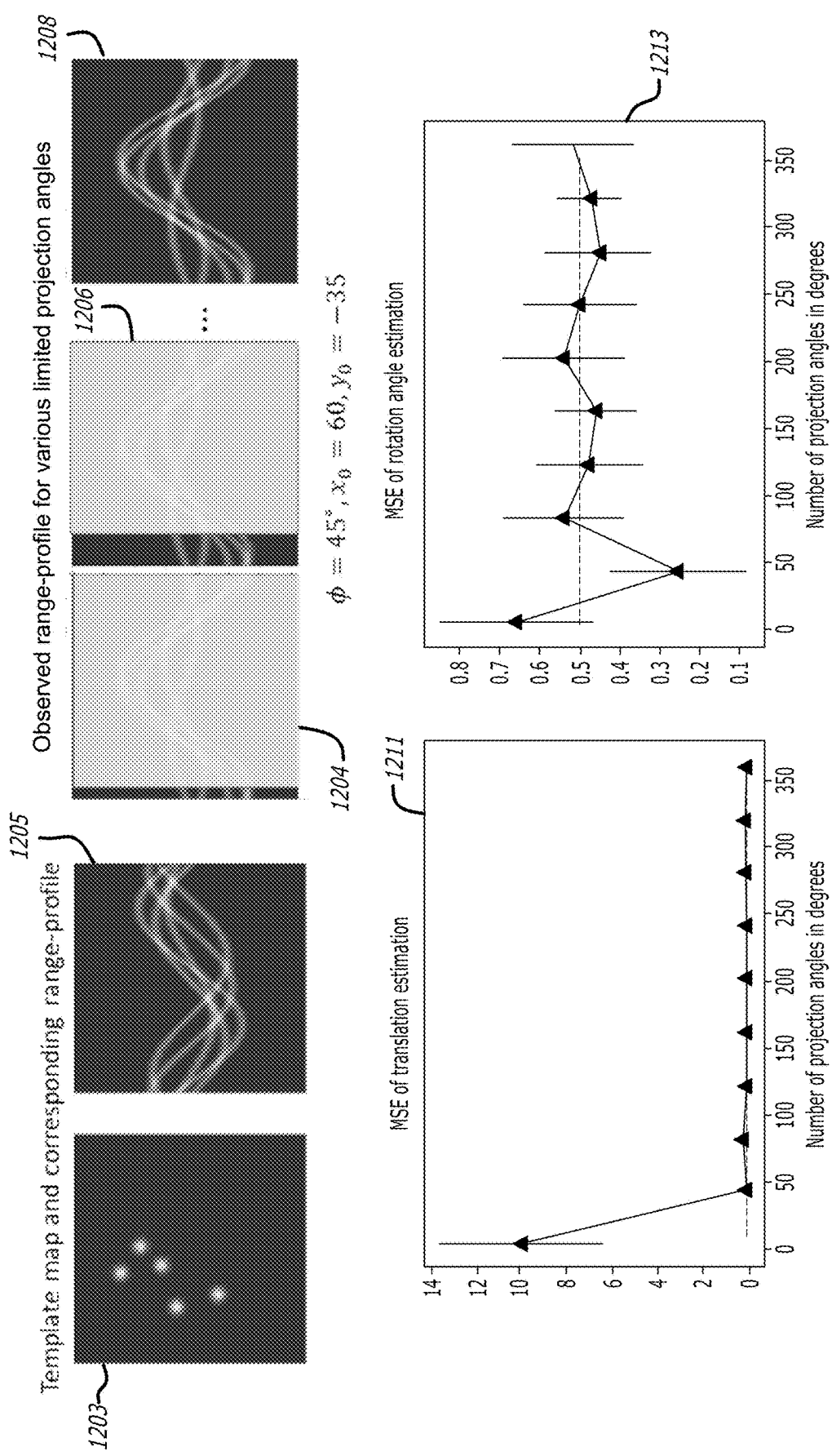
FIG. 12 illustrates a mean square error of translation and rotation parameter estimates for various observed number of projection angles in accordance with an example of the disclosure.

FIG. 12 illustrates a mean square error of translation and rotation parameter estimates for various observed limited (e.g., sparse) number of projection angles in accordance with an example of the disclosure. In one non-limiting example, FIG. 12 illustrates template image data 1203 and template range profile data 1205 that include a full complement of projection angles (e.g., three hundred sixty projection angles). FIG. 12 also shows observed range profile data 1204, 1206, and 1208 rotated from template range profile data 1205 by forty five degrees and translated in the x direction by $x_0$ equal to 60 pixels and the y direction by $y_0$ equal to minus thirty five pixels. Observed range profile data 1204 is limited to ten projection angles, observed range profile data 1206 is limited to fifty projection angles, and observed range profile data 1208 includes a full three hundred sixty projection angles.

FIG. 12 includes plot 1211 and plot 1213 that illustrate a mean squared error (MSE) of the translation estimation and the rotation angle estimation, respectively, for observed range profile data 1204, 1206, and 1208. As shown in plot 1211 for MSE of translation estimation, using ten projection angles of observed range profile data results in an MSE of ten, and the MSE decreases to approximately zero at fifty projection angles. As shown in plot 1213 for MSE of rotation angle, the rotation angle error decreases to an approximately five tenths MSE at one hundred projection angles. Plot 1211 and plot 1213 illustrate that a Wasserstein distance and a gradient descent optimization is effective for estimating registration parameters, with a nearly zero MSE for a limited number of observed projection angles.

Figure 13A:
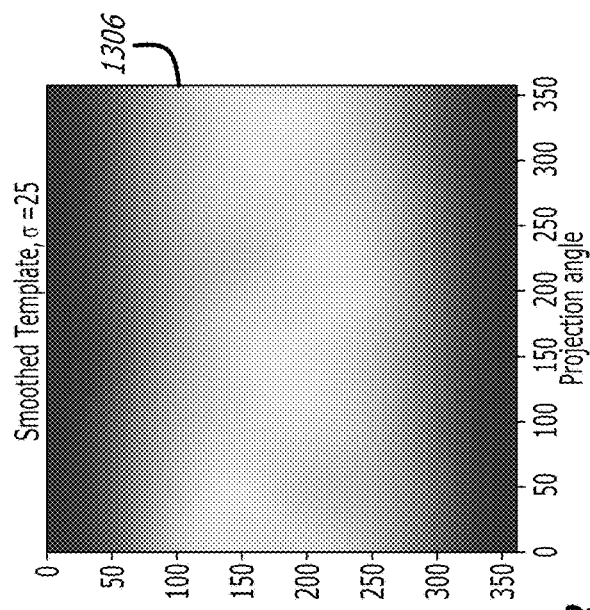
FIGS. 13A and 13B illustrate an energy landscape of a rotation loss function with respect to a p-Wasserstein distance with and without smoothing in accordance with examples of the disclosure.
Figure 13A:
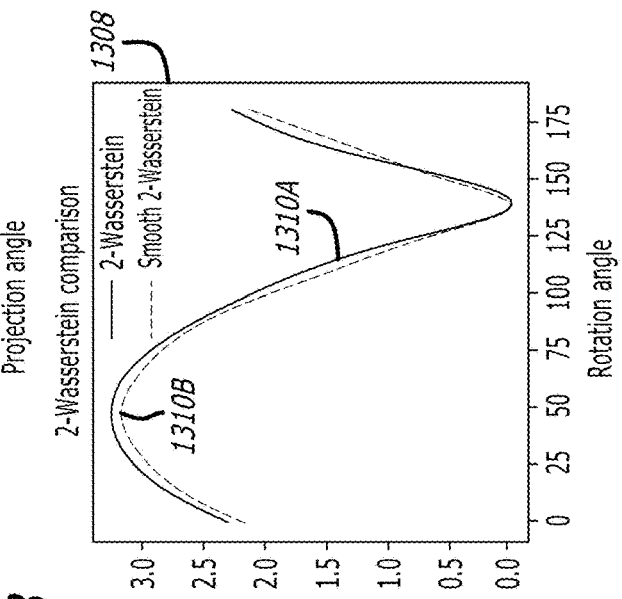
Figure 13B:
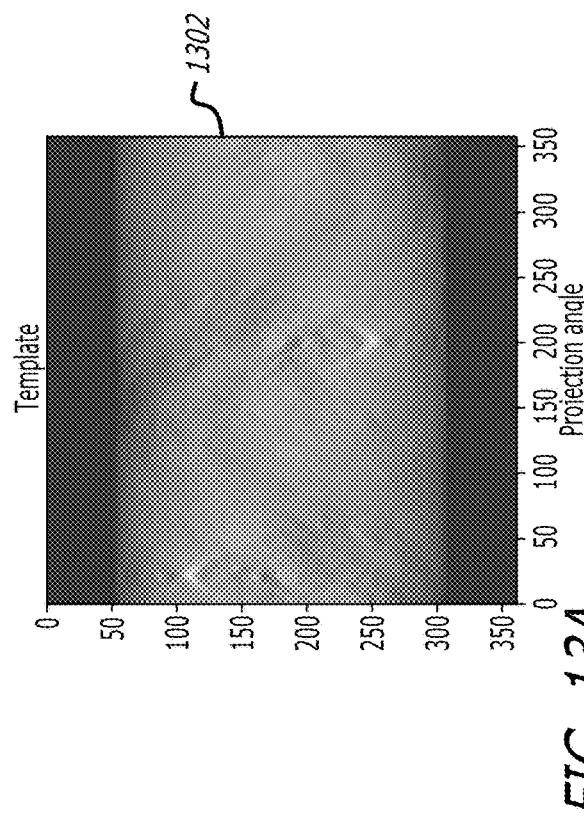
Figure 13B:
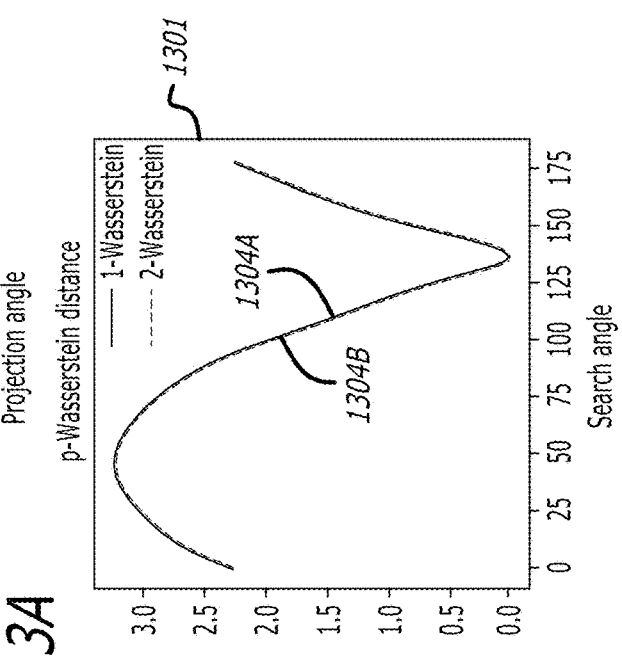

FIGS. 13A and 13B illustrate the effects of smoothing techniques used to find the global minimum of the non-convex loss function. In one example, an observed range profile data 1302 of FIG. 13A differs from a template range profile data by a one hundred thirty five degree rotation angle. FIG. 13A illustrates a plot 1301 of a 1-Wasserstein energy landscape 1304A and a 2-Wasserstein energy landscape 1304B of an unaltered (e.g., not smoothed) observed range profile data 1302. As illustrated, the 1-Wasserstein energy landscape 1304A and 2-Wasserstein energy landscape 1304B both have a smooth energy landscape with a single minimum. FIG. 13B shows a plot 1308 of a 2-Wasserstein energy landscape 1310A (e.g., unsmoothed), and a Smooth 2-Wasserstein energy landscape 1310B of a smoothed observed range profile data 1306 that has been smoothed by a Gaussian filter with σ=25. Plot 1308 shows that the 2-Wasserstein energy landscape 1310A has a smooth energy landscape with a single minimum, and the Smooth 2-Wasserstein energy landscape 1310B essentially tracks the 2-Wasserstein energy landscape 1310A, illustrating that smoothing techniques are not needed for Wasserstein based optimization techniques.

Figure 14:
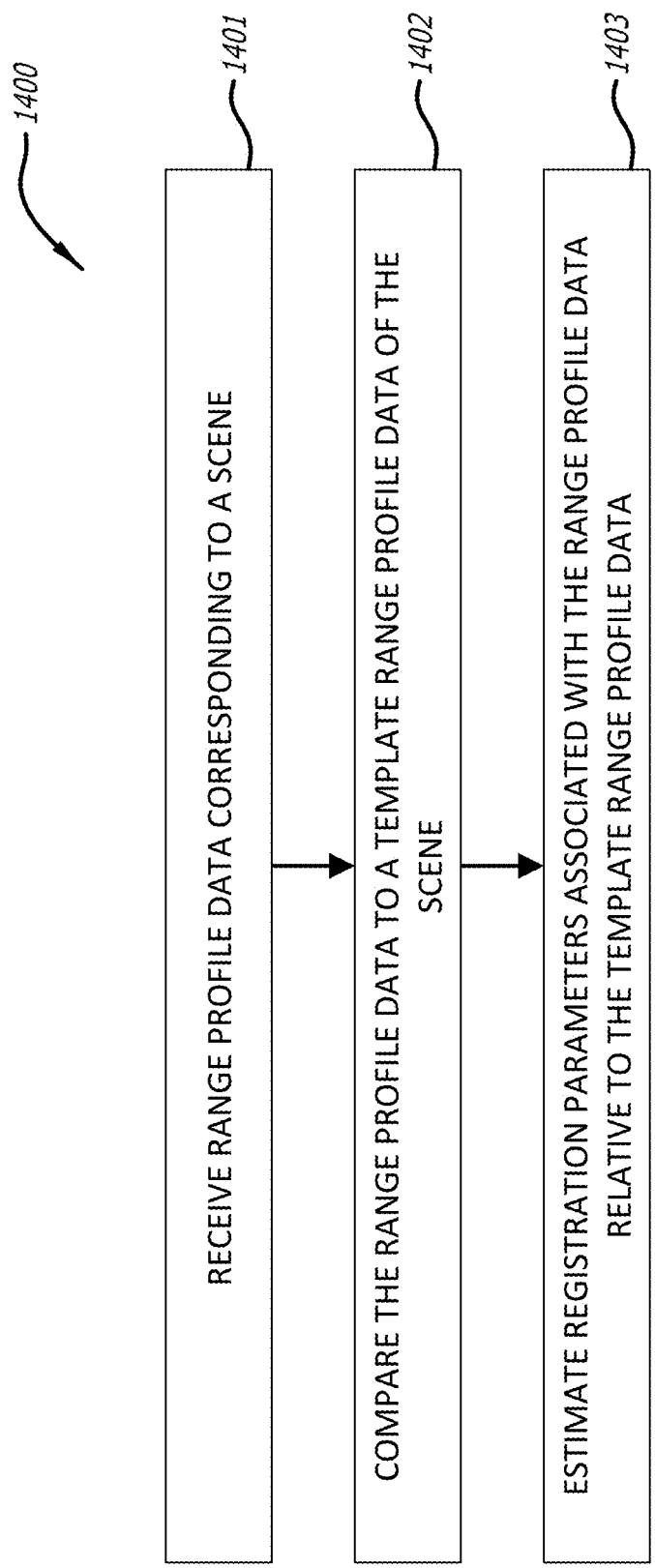
FIGS. 14 and 15 illustrate flow charts for estimating registration parameters of observed range profile data in accordance with examples of the disclosure.
Figure 15:
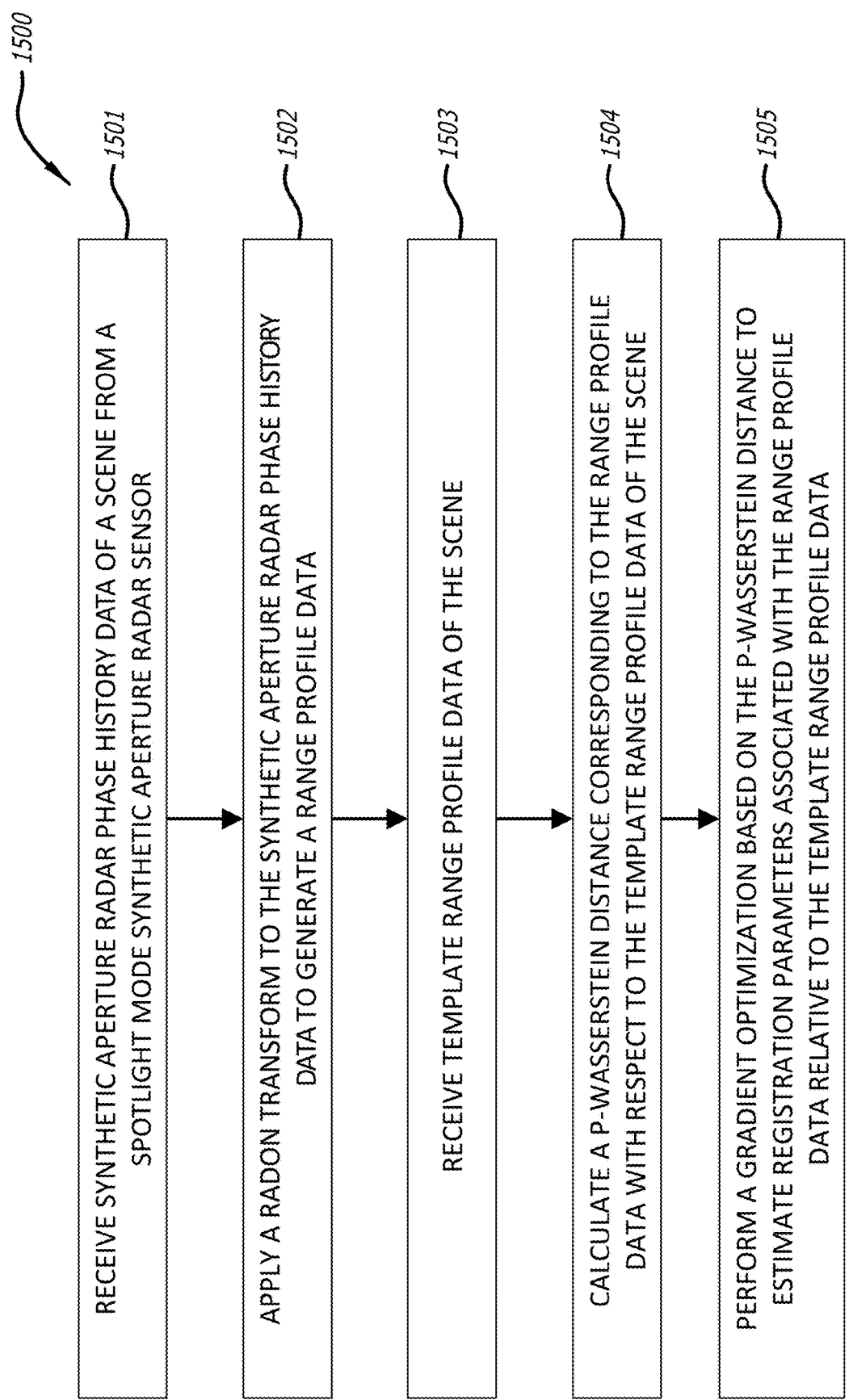

FIGS. 14 and 15 illustrate flow charts for estimating registration parameters of observed range profile data in accordance with examples of the disclosure. The methods described herein are an efficient method for navigation using synthetic aperture radar (SAR) range profile data. In one example, SAR range profile data is used to enable SAR-based navigation without the need for computationally intensive SAR image reconstruction and feature detection. The methods utilize a p-Wasserstein distance as a metric for registration that provides a smooth energy landscape and justifies the use of a gradient descent optimization to estimate the registration parameters.

Referring to FIG. 14, method 1400 includes operations (step 1401) of receiving observed range profile data corresponding to a scene. Method 1400 further includes operations (step 1402) of comparing the observed range profile data to a template range profile data of the scene. In some examples, the template range profile data comprises a plurality of projection angles of the scene (e.g., such as three hundred sixty projection angles), and the observed range profile data comprising a subset of the plurality of projection angles of the scene. In various examples, the observed range profile data may include fewer projection angles than the template range profile data.

Method 1400 further includes operations (step 1403) of estimating registration parameters associated with the observed range profile data relative to the template range profile data to determine a deviation from the template range profile data. In various examples, the registration parameters comprise one of a rotation angle, a scaling, or an x,y translation of the observed range profile data relative to the template range profile data. In some examples, operations of step 1403 include updating a synthetic aperture radar navigation (e.g., SAR navigation system 300) based on the deviation from the template range profile data.

Referring to FIG. 15, method 1500 includes operations (step 1501) of receiving synthetic aperture radar phase history data of a scene from a spotlight mode synthetic aperture radar sensor.

Method 1500 further includes operations (step 1502) of applying a radon transform to the synthetic aperture radar phase history data to generate an observed range profile data.

Method 1500 further includes operations (step 1503) of receiving a template range profile data of the scene. The template range profile data may comprise a plurality of projection angles of the scene, and the observed range profile data may comprise a subset of the plurality of projection angles of the scene. Operations of step 1503 include storing the template range profile data in a memory.

Method 1500 further includes operations (step 1504) of calculating a Wasserstein distance (e.g., a p-Wasserstein distance) corresponding to the observed range profile data with respect to the template range profile data of the scene. In various examples, the Wasserstein distance, based on one or more of the registration parameters, comprises a smooth energy landscape with a single global minimum corresponding to optimal values for the one or more of the registration parameters. A Wasserstein distance can provide for an accurate estimate of the registration parameters using only a subset (e.g., a limited or a sparse number) of projection angles. In other examples, operations of step 1504 include calculating a 2-Wasserstein distance corresponding to the observed range profile data with respect to the template range profile data.

Method 1500 further includes operations (step 1505) of performing a gradient optimization based on the p-Wasserstein distance to estimate registration parameters associated with the observed range profile data relative to the template range profile data. In some examples, performing the gradient descent optimization comprises converging to the single global minimum to estimate each of the registration parameters.

In various examples, performing the gradient descent optimization comprises performing a dual formulation of the optimization or a primal formulation of the optimization. In some examples, operations of step 1505 include estimating the registration parameters by performing a plurality of iterations based on the calculating the p-Wasserstein distance and the performing the gradient descent optimization based on the p-Wasserstein distance.

Advantageously, SAR navigation system 300 performs navigation directly based on range profile data and removes the need for reconstruction of images from SAR data. SAR navigation system 300 also leverages the smoothness characteristic of the p-Wasserstein distances to recover the registration parameters from an under sampled SAR phase history data in few iterations (e.g., iterations of the gradient descent optimization), reducing the sensing requirements of an aerial vehicle. This reduction enables SAR-based navigation to be deployed on platforms with limited computational power and low size, weight and power (SWaP).

Where applicable, various embodiments provided by the present disclosure can be implemented using hardware, software, or combinations of hardware and software. Also, where applicable, the various hardware components and software components set forth herein can be combined into composite components comprising software, hardware, or both without departing from the spirit of the present disclosure. Where applicable, the various hardware components and software components set forth herein can be separated into sub-components comprising software, hardware, or both without departing from the spirit of the present disclosure. In addition, where applicable, it is contemplated that software components can be implemented as hardware components, and vice-versa. As used herein, and/or may include all of the listed elements when inclusion of all elements is not contradictory, or may include any one of the listed elements.

Software in accordance with the present disclosure, such as program code or data or both thereof, can be stored on one or more computer readable media. It is also contemplated that software identified herein can be implemented using one or more general purpose or specific purpose computers or computer systems, networked or otherwise. Where applicable, the ordering of various steps described herein can be changed, combined into composite steps, or separated into sub-steps to provide features described herein.

Examples described above illustrate but do not limit the invention. It should also be understood that numerous modifications and variations are possible in accordance with the principles of the present invention. Accordingly, the scope of the invention is defined only by the following claims.

What is claimed is:

1. A method for synthetic aperture radar (SAR) mapping and registration to aid in SAR-based navigation, the method comprising:
   transmitting, by a synthetic aperture radar sensor (220), electromagnetic waves at a scene;
   receiving (1501), by the synthetic aperture radar sensor (220), radar phase history data (112A-112C) of backscattered waves associated with observed views of the scene (102);
   generating (1502), by a processor (210), range profile data (302) associated with the observed views of the scene (102) by using the radar phase history data (112A-112C);
   comparing (1402), by the processor (210), the range profile data to a template range profile data (304) of the scene by calculating (1504) a Wasserstein distance (306, 408) corresponding to the range profile data with respect to the template range profile data, wherein the Wasserstein distance (306, 408) comprises normalized probability density functions (pdfs); and
   estimating (1403), by the processor (210), registration parameters (1013) associated with the range profile data relative to the template range profile data to determine a deviation from the template range profile data by performing (1505) a gradient descent optimization (308) based on the Wasserstein distance (306, 408).

2. The method of claim 1, wherein the Wasserstein distance identifies a global minimum of one or more of the registration parameters.

3. The method of claim 1, wherein the Wasserstein distance comprises a p-Wasserstein distance (306) or a 2-Wasserstein distance (408).

4. The method of claim 1, wherein the Wasserstein distance, based on one or more of the registration parameters, comprises a smooth energy landscape with a single global minimum corresponding to optimal values for one or more of the registration parameters, and the gradient descent optimization comprises converging to the single global minimum to estimate at least one of the one or more of the registration parameters.

5. The method of claim 1, wherein the performing the gradient descent optimization comprises performing (1505) a dual formulation (908) of the optimization or a primal formulation (906) of the optimization, and wherein the estimating (1505) the registration parameters further comprises performing a plurality of iterations based on the calculating the Wasserstein distance and the performing the gradient descent optimization based on the Wasserstein distance.

6. The method of claim 1, wherein the registration parameters comprise one of a rotation angle, an x,y translation, or a scaling of the range profile data relative to the template range profile data.

7. The method of claim 1, wherein the template range profile data comprises a plurality of projection angles (813) of the scene, and the receiving further comprises receiving (1503) the range profile data comprising a subset (810) of the plurality of projection angles of the scene.

8. The method of claim 1,
   wherein the generating of the range profile data comprises the processor applying (1502) a radon transform to the radar phase history data to generate the range profile data.

9. The method of claim 1, further comprising:
   storing (1503) the template range profile data in a memory (214); and
   updating (1403) a synthetic aperture radar navigation system (300) based on the deviation from the template range profile data.

10. An aerial vehicle (101) adapted to perform the method of claim 1, the aerial vehicle comprising:
    a memory (214) comprising a plurality of executable instructions and adapted to store template range profile data;
    the synthetic aperture radar sensor (220); and
    the processor (210) adapted to execute the plurality of instructions to perform the method of claim 1.

11. A system for synthetic aperture radar (SAR) mapping and registration to aid in SAR-based navigation, the system comprising:
    a synthetic aperture radar sensor (220) to transmit electromagnetic waves at a scene, and to receive radar phase history data (112A-112C) of backscattered waves associated with observed views of the scene (102);
    a memory (214) comprising a plurality of executable instructions; and
    a processor (210) adapted to:
    generate range profile data (302) associated with the observed views of the scene (102) by using the radar phase history data (112A-112C);
    compare the range profile data to a template range profile data (304) of the scene by calculating a Wasserstein distance (306, 408) corresponding to the range profile data with respect to the template range profile data, wherein the Wasserstein distance (306, 408) comprises normalized probability density functions (pdfs); and
    estimate registration parameters (1013) associated with the range profile data relative to the template range profile data to determine a deviation from the template range profile data by performing a gradient descent optimization (308) based on the Wasserstein distance (306, 408).

12. The system of claim 11, wherein the Wasserstein distance identifies a global minimum of one or more of the registration parameters.

13. The system of claim 11, wherein the gradient descent optimization comprises a dual formulation (908) of the optimization or a primal formulation (906) of the optimization.

14. The system of claim 11, wherein the Wasserstein distance, based on one or more of the registration parameters, comprises a smooth energy landscape with a single global minimum corresponding to optimal values for one or more of the registration parameters, and the gradient descent optimization is adapted to converge to the single global minimum to estimate at least one of the one or more of the registration parameters.

15. The system of claim 11, wherein the processor is further adapted to estimate the registration parameters based on a plurality of iterations to calculate the Wasserstein distance and perform the gradient descent optimization based on the Wasserstein distance.

16. The system of claim 11, wherein the registration parameters comprise one of a rotation angle, an x,y translation, or a scaling of the range profile data relative to the template range profile data.

17. The system of claim 11, wherein the template range profile data comprises a plurality of projection angles (813) of the scene, and the range profile data comprises a subset (810) of the plurality of projection angles of the scene.

18. The system of claim 11, wherein the processor is further adapted to:
  receive the radar phase history data (112A-112C) of the observed views of the scene from the synthetic aperture radar sensor (220);
  apply a radon transform to the radar phase history data to generate the range profile data; and
  update a synthetic aperture radar navigation system (300) based on the deviation from the template range profile data;
  wherein the memory is adapted to store the template range profile data.

19. The system of claim 11, further comprising an aerial vehicle (101) comprising the synthetic aperture radar sensor (220).

20. The system of claim 11, wherein the Wasserstein distance comprises a p-Wasserstein distance (306) or a 2-Wasserstein distance (408).

* * * * *